US009573223B2

(12) United States Patent
Armbruster et al.

(10) Patent No.: US 9,573,223 B2
(45) Date of Patent: *Feb. 21, 2017

(54) MARKING APPARATUS WITH A PLURALITY OF GAS LASERS WITH RESONATOR TUBES AND INDIVIDUALLY ADJUSTABLE DEFLECTION MEANS

(75) Inventors: Kevin L. Armbruster, Chicopee, MA (US); Brad D. Gilmartin, Gardner, MA (US); Peter J. Kueckendahl, Bad Oldesloe (DE); Bernard J. Richard, Dudley, MA (US); Daniel J. Ryan, Sycamore, IL (US)

(73) Assignee: ALLTEC ANGEWANDTE LASERLICHT TECHNOLOGIE GMBH, Selmsdorf (DE)

( * ) Notice: Subject to any disclaimer, the term of this patent is extended or adjusted under 35 U.S.C. 154(b) by 108 days.

This patent is subject to a terminal disclaimer.

(21) Appl. No.: 14/342,499

(22) PCT Filed: Jul. 19, 2012

(86) PCT No.: PCT/EP2012/003068
§ 371 (c)(1),
(2), (4) Date: Mar. 3, 2014

(87) PCT Pub. No.: WO2013/034213
PCT Pub. Date: Mar. 14, 2013

(65) Prior Publication Data
US 2014/0224778 A1 Aug. 14, 2014

(30) Foreign Application Priority Data

Sep. 5, 2011 (EP) .................................. 11007183

(51) Int. Cl.
*B23K 26/00* (2014.01)
*B23K 26/08* (2014.01)
(Continued)

(52) U.S. Cl.
CPC ....... *B23K 26/0807* (2013.01); *B23K 26/0084* (2013.01); *B23K 26/0604* (2013.01);
(Continued)

(58) Field of Classification Search
CPC ............ B23K 26/0084; B23K 26/0604; B23K 26/0608; B23K 26/0643; B23K 26/0648; B23K 26/0807; B23K 26/365; B23K 26/00; H01S 3/2383; H01S 3/03; H01S 3/076; H01S 3/08059; H01S 3/2232; H01S 3/005; H01S 3/0071; H01S 3/101; H01S 3/23
(Continued)

(56) References Cited

U.S. PATENT DOCUMENTS 2,359,780 A 10/1944 Glenn
3,465,358 A * 9/1969 Bridges .................. H01S 3/121
372/12
(Continued)

FOREIGN PATENT DOCUMENTS

DE 4029187 A1 3/1992
DE 4212390 A1 10/1993
(Continued)

OTHER PUBLICATIONS

U.S. Appl. No. 14/342,510, Office Action dated Aug. 1, 2014.
(Continued)

*Primary Examiner* — Eric Stapleton
(74) *Attorney, Agent, or Firm* — Hoffman Warnick LLC

(57) ABSTRACT

The invention relates to a marking apparatus (100) for marking an object with laser light, comprising a plurality of gas lasers (10) and a control unit for individually activating each of the gas lasers (10) to emit a laser beam according to a sign to be marked. The gas lasers (10) are stacked such that the laser beams emitted by the gas lasers (10) form an array
(Continued)

of laser beams, in particular a linear array with parallel laser beams, each gas laser (10a-i) comprises laser tubes (12) that at least partially surround an inner area (5). The apparatus (100) further comprises beam-delivery means (14) for directing the array of laser beams into the inner area (5) and a set of deflection means (30) for rearranging the array of laser beams into a desired array of laser beams. The set of deflection means (30) is arranged in the inner area (5) and comprises at least one deflection means (33a, 33i) per laser beam, in particular at least one mapping mirror (33a, 33i) or one optical waveguide per laser beam. Each deflection means (30) is individually adjustable in its deflection direction and/or individually shiftable.

21 Claims, 12 Drawing Sheets

(51) Int. Cl.
  B23K 26/06     (2014.01)
  H01S 3/23      (2006.01)
  B23K 26/36     (2014.01)
  H01S 3/07      (2006.01)
  H01S 3/08      (2006.01)
  H01S 3/223     (2006.01)
  H01S 3/00      (2006.01)
  H01S 3/03      (2006.01)

(52) U.S. Cl.
  CPC ...... B23K 26/0608 (2013.01); B23K 26/0643 (2013.01); B23K 26/0648 (2013.01); B23K 26/082 (2015.10); B23K 26/362 (2013.01); H01S 3/2383 (2013.01); H01S 3/005 (2013.01); H01S 3/03 (2013.01); H01S 3/076 (2013.01); H01S 3/08059 (2013.01); H01S 3/2232 (2013.01)

(58) Field of Classification Search
  USPC .................................................. 219/121.68
  See application file for complete search history.

(56)  References Cited

U.S. PATENT DOCUMENTS

| | | | | |
|---|---|---|---|---|
| 3,533,012 A | * | 10/1970 | Johnson | H01S 3/02 372/107 |
| 3,564,449 A | * | 2/1971 | Muller et al. | H01S 3/0975 372/39 |
| 3,564,452 A | * | 2/1971 | Rempel | H01S 3/086 356/153 |
| 3,596,202 A | * | 7/1971 | Patel | H01S 3/2232 372/103 |
| 3,602,837 A | * | 8/1971 | Goldsborough | H01S 3/0975 333/99 PL |
| 3,609,584 A | * | 9/1971 | Stitch | H01S 3/005 359/288 |
| 3,628,175 A | * | 12/1971 | Rigden | H01S 3/03 359/223.1 |
| 3,638,137 A | * | 1/1972 | Krupke | H01S 3/1061 372/103 |
| 3,646,476 A | * | 2/1972 | Barker | H01S 3/097 313/594 |
| 3,705,999 A | | 12/1972 | Hermann et al. | |
| 3,721,915 A | * | 3/1973 | Reilly | H01S 3/0971 372/33 |
| 3,801,929 A | * | 4/1974 | Kawasaki | H01S 3/1398 372/32 |
| 3,851,272 A | * | 11/1974 | Shull | H01S 3/03 313/607 |
| 3,900,804 A | * | 8/1975 | Davis | H01S 3/0979 359/337 |
| 3,919,663 A | | 11/1975 | Caruolo et al. | |
| 3,946,233 A | * | 3/1976 | Erben | F41H 13/0062 250/203.2 |
| 4,053,851 A | * | 10/1977 | Krupke | H01S 3/097 372/19 |
| 4,122,853 A | * | 10/1978 | Smith | A61F 9/00821 604/37 |
| 4,125,755 A | * | 11/1978 | Plamquist | B23K 26/043 219/121.62 |
| 4,131,782 A | | 12/1978 | Einstein et al. | |
| 4,170,405 A | | 10/1979 | Sziklas | |
| 4,189,687 A | | 2/1980 | Wieder et al. | |
| 4,270,845 A | * | 6/1981 | Takizawa | A61B 18/201 219/121.6 |
| 4,376,496 A | | 3/1983 | Sedam et al. | |
| 4,376,946 A | | 3/1983 | Kaminow et al. | |
| 4,404,571 A | | 9/1983 | Kitamura | |
| 4,467,334 A | | 8/1984 | Anzai | |
| 4,477,907 A | * | 10/1984 | McMahan | H01S 3/041 372/108 |
| 4,500,996 A | * | 2/1985 | Sasnett | H01S 3/03 372/103 |
| 4,500,998 A | | 2/1985 | Kuwabara et al. | |
| 4,512,639 A | * | 4/1985 | Roberts | G02B 3/0087 359/666 |
| 4,554,666 A | * | 11/1985 | Altman | H01S 3/2232 372/101 |
| 4,596,018 A | * | 6/1986 | Gruber | H01S 3/03 372/61 |
| 4,614,913 A | * | 9/1986 | Honeycutt | F41H 13/005 356/152.3 |
| 4,652,722 A | * | 3/1987 | Stone | B23K 26/0604 219/121.7 |
| 4,655,547 A | * | 4/1987 | Heritage | B23K 26/06 359/559 |
| 4,660,209 A | * | 4/1987 | Osada | H01S 3/03 372/34 |
| 4,665,607 A | * | 5/1987 | Ressencourt | B21D 35/00 219/121.67 |
| 4,672,620 A | * | 6/1987 | Slusher | H01S 3/2232 372/107 |
| 4,689,467 A | * | 8/1987 | Inoue | B23K 10/00 219/121.6 |
| 4,720,618 A | | 1/1988 | Stamer et al. | |
| 4,727,235 A | | 2/1988 | Stamer et al. | |
| 4,744,090 A | | 5/1988 | Freiberg | |
| 4,770,482 A | * | 9/1988 | Sweeney | G01S 7/484 244/3.16 |
| 4,779,278 A | * | 10/1988 | McKinney | H01S 3/0804 372/101 |
| 4,819,246 A | * | 4/1989 | Aiello | H01S 3/03 372/107 |
| 4,831,333 A | * | 5/1989 | Welch | H01S 3/2383 349/1 |
| 4,845,716 A | * | 7/1989 | Poehler | H01S 3/105 372/10 |
| 4,846,550 A | * | 7/1989 | Schuma | B23K 26/06 359/669 |
| 4,856,007 A | * | 8/1989 | Weiss | H01S 3/036 372/20 |
| 4,858,240 A | * | 8/1989 | Pohler | H01S 3/105 372/10 |
| 4,907,240 A | | 3/1990 | Klingel | |
| 4,912,718 A | | 3/1990 | Klingel | |
| 4,953,176 A | * | 8/1990 | Ekstrand | H01S 3/041 372/107 |
| 4,958,900 A | * | 9/1990 | Ortiz, Jr. | B23K 26/0604 385/135 |
| 4,991,149 A | | 2/1991 | Maccabee | |
| 5,001,718 A | * | 3/1991 | Burrows | H01S 3/005 372/101 |
| 5,012,259 A | | 4/1991 | Hattori et al. | |
| 5,023,886 A | * | 6/1991 | Hobart | B23K 26/06 372/105 |

(56) References Cited

U.S. PATENT DOCUMENTS

| | | | |
|---|---|---|---|
| 5,052,017 A * | 9/1991 | Hobart | B23K 26/06 372/105 |
| 5,065,405 A * | 11/1991 | Laakmann | H01S 3/03 372/82 |
| 5,097,481 A * | 3/1992 | Fritzsche | H01S 3/08059 372/105 |
| 5,109,149 A | 4/1992 | Leung | |
| 5,115,446 A | 5/1992 | Von Borstel et al. | |
| 5,162,940 A * | 11/1992 | Brandelik | H01S 3/2333 359/333 |
| 5,199,042 A * | 3/1993 | Papetti | H01S 3/08081 372/100 |
| 5,214,658 A * | 5/1993 | Ostler | H01S 3/104 372/19 |
| 5,229,573 A * | 7/1993 | Stone | B23K 26/06 219/121.68 |
| 5,229,574 A * | 7/1993 | Stone | B23K 26/06 219/121.68 |
| 5,268,921 A | 12/1993 | McLellan | |
| 5,274,661 A * | 12/1993 | von Gunten | G02B 5/0833 359/580 |
| 5,294,774 A * | 3/1994 | Stone | B23K 26/06 219/121.74 |
| 5,337,325 A | 8/1994 | Hwang | |
| 5,339,737 A | 8/1994 | Lewis et al. | |
| 5,386,427 A * | 1/1995 | Zayhowski | G02B 7/028 372/101 |
| 5,386,431 A * | 1/1995 | Tulip | H01S 3/2383 359/346 |
| 5,422,906 A * | 6/1995 | Karasaki | H01S 3/0014 372/108 |
| 5,426,659 A * | 6/1995 | Sugiyama | H01S 3/036 372/34 |
| 5,431,199 A | 7/1995 | Benjay et al. | |
| 5,504,763 A * | 4/1996 | Bischel | H01S 3/2333 372/108 |
| 5,506,858 A * | 4/1996 | Takenaka | B23K 26/06 372/108 |
| 5,544,186 A * | 8/1996 | Sauer | G01N 21/39 372/102 |
| 5,550,853 A * | 8/1996 | Ostler | H01S 3/041 372/34 |
| 5,568,306 A * | 10/1996 | Mandel | B23K 26/032 359/196.1 |
| 5,572,538 A | 11/1996 | Saitoh et al. | |
| 5,592,504 A | 1/1997 | Cameron | |
| 5,596,594 A * | 1/1997 | Egawa | B23K 26/06 372/107 |
| RE35,446 E * | 2/1997 | Stone | B23K 26/06 219/121.74 |
| 5,608,754 A * | 3/1997 | Murakami | H01S 3/0346 372/107 |
| 5,646,907 A | 7/1997 | Maccabee | |
| 5,653,900 A * | 8/1997 | Clement | B23K 26/0838 219/121.68 |
| 5,659,561 A * | 8/1997 | Torruellas | G02F 1/35 372/101 |
| 5,670,064 A * | 9/1997 | Nakata | B23K 26/06 219/121.6 |
| 5,682,262 A * | 10/1997 | Wefers | H01S 3/005 349/1 |
| 5,689,363 A * | 11/1997 | Dane | H01S 3/2341 359/334 |
| 5,706,305 A | 1/1998 | Yamane et al. | |
| 5,720,894 A * | 2/1998 | Neev | A61B 18/20 216/65 |
| 5,729,568 A | 3/1998 | Opower et al. | |
| 5,767,477 A * | 6/1998 | Sutter, Jr. | B23K 26/0807 219/121.76 |
| 5,808,268 A * | 9/1998 | Balz | G06K 1/126 219/121.8 |
| 5,815,523 A | 9/1998 | Morris | |
| 5,837,962 A * | 11/1998 | Overbeck | B23K 26/06 219/121.6 |
| 5,864,430 A * | 1/1999 | Dickey | B23K 26/073 219/121.69 |
| 5,884,588 A | 3/1999 | Ap et al. | |
| 5,929,337 A | 7/1999 | Collins et al. | |
| 5,982,803 A | 11/1999 | Sukhman et al. | |
| 6,050,486 A | 4/2000 | French et al. | |
| 6,057,871 A | 5/2000 | Peterson | |
| 6,064,034 A * | 5/2000 | Rieck | B23K 26/032 219/121.84 |
| 6,069,843 A | 5/2000 | DiMarzio et al. | |
| 6,122,562 A | 9/2000 | Kinney et al. | |
| 6,141,030 A | 10/2000 | Fujita et al. | |
| 6,180,913 B1 * | 1/2001 | Kolmeder | B23K 26/06 219/121.68 |
| 6,181,728 B1 * | 1/2001 | Cordingley | B23K 26/0635 372/106 |
| 6,192,061 B1 * | 2/2001 | Hart | H01S 3/0315 372/107 |
| 6,210,401 B1 * | 4/2001 | Lai | B23K 26/043 351/209 |
| 6,229,940 B1 | 5/2001 | Rice et al. | |
| 6,256,121 B1 * | 7/2001 | Lizotte | B23K 26/04 216/17 |
| 6,263,007 B1 | 7/2001 | Tang | |
| 6,269,111 B1 * | 7/2001 | Mori | B23K 26/06 372/108 |
| 6,303,930 B1 | 10/2001 | Hagiwara | |
| 6,310,701 B1 * | 10/2001 | Lizotte | B23K 26/04 216/17 |
| 6,313,957 B1 * | 11/2001 | Heemstra | B23K 26/0643 359/619 |
| 6,341,042 B1 * | 1/2002 | Matsunaka | B23K 26/0639 257/E21.347 |
| 6,356,575 B1 * | 3/2002 | Fukumoto | H01S 3/082 372/97 |
| 6,370,884 B1 | 4/2002 | Kelada | |
| 6,420,675 B1 * | 7/2002 | Lizotte | B23K 26/04 219/121.7 |
| 6,421,159 B1 | 7/2002 | Sutter et al. | |
| 6,476,350 B1 * | 11/2002 | Grandjean | B23K 26/032 219/121.22 |
| 6,495,795 B2 * | 12/2002 | Gortler | B23K 26/0613 219/121.84 |
| 6,512,781 B1 * | 1/2003 | Borstel | H01S 3/0805 372/103 |
| 6,539,045 B1 | 3/2003 | Von Borstel et al. | |
| 6,621,838 B2 | 9/2003 | Naito et al. | |
| 6,661,568 B2 * | 12/2003 | Hollemann | H01S 3/005 359/333 |
| 6,690,702 B1 * | 2/2004 | Ohmi | H01S 3/225 372/35 |
| 6,693,930 B1 * | 2/2004 | Chuang | G02B 27/106 372/25 |
| 6,768,765 B1 * | 7/2004 | Schroeder | H01S 3/034 372/103 |
| 6,791,592 B2 * | 9/2004 | Assa | G06K 1/126 219/121.8 |
| 6,829,000 B2 * | 12/2004 | Assa | G06K 1/126 347/242 |
| 6,856,509 B2 | 2/2005 | Lin | |
| 6,861,614 B1 * | 3/2005 | Tanabe | B23K 26/04 219/121.66 |
| 6,898,216 B1 * | 5/2005 | Kleinschmidt | G02B 27/48 372/29.023 |
| 6,915,654 B2 | 7/2005 | Johnson | |
| 6,944,201 B2 * | 9/2005 | Bunting | H01S 3/09415 372/11 |
| 7,046,267 B2 * | 5/2006 | Franklin | B41J 3/4073 347/234 |
| 7,058,100 B2 | 6/2006 | Vetrovec et al. | |
| 7,167,194 B2 * | 1/2007 | Assa | G06K 1/126 347/224 |
| 7,170,251 B2 * | 1/2007 | Huang | B23K 26/04 318/563 |

(56) References Cited

U.S. PATENT DOCUMENTS

| | | | | |
|---|---|---|---|---|
| 7,190,144 B2* | 3/2007 | Huang | ............... | B23K 26/04 318/568.2 |
| 7,200,464 B2* | 4/2007 | Nussbaum | ......... | G06K 7/10851 318/600 |
| 7,291,999 B2* | 11/2007 | Huang | ............... | B23K 26/04 318/563 |
| 7,331,512 B2* | 2/2008 | Caiger | ............... | B23K 26/032 118/726 |
| 7,334,744 B1 | 2/2008 | Dawson | | |
| 7,346,427 B2 | 3/2008 | Hillam et al. | | |
| 7,394,479 B2* | 7/2008 | Assa | ............... | B23K 26/063 347/246 |
| 7,421,308 B2* | 9/2008 | Nussbaum | ......... | G06K 7/10851 250/236 |
| 7,496,831 B2 | 2/2009 | Dutta et al. | | |
| 7,521,649 B2* | 4/2009 | Umetsu | ............... | B23K 26/067 219/121.65 |
| 7,521,651 B2 | 4/2009 | Gross et al. | | |
| 7,543,912 B2 | 6/2009 | Anderson et al. | | |
| 7,565,705 B2 | 7/2009 | Elkins et al. | | |
| 8,164,025 B1* | 4/2012 | Kunas | ............... | B23K 26/0033 219/121.68 |
| 8,168,921 B1* | 5/2012 | Kunas | ............... | B23K 26/0033 219/121.68 |
| 8,212,178 B1* | 7/2012 | Kunas | ............... | B23K 26/0033 219/121.68 |
| 8,263,898 B2 | 9/2012 | Alber | | |
| 2001/0030983 A1 | 10/2001 | Yuri et al. | | |
| 2001/0045418 A1* | 11/2001 | Brandinger | ......... | B23K 26/0604 219/121.74 |
| 2002/0021730 A1* | 2/2002 | Schroeder | ............ | G03F 7/70025 372/57 |
| 2002/0071466 A1* | 6/2002 | Zeller | ............... | H01S 3/0385 372/55 |
| 2002/0080845 A1* | 6/2002 | Schulz | ............... | B23K 26/0656 372/108 |
| 2002/0114362 A1* | 8/2002 | Vogler | ............... | G02B 5/1814 372/32 |
| 2002/0162825 A1* | 11/2002 | Lizotte | ............... | B23K 26/04 219/121.7 |
| 2002/0196534 A1* | 12/2002 | Lizotte | ............... | B23K 26/0608 359/362 |
| 2003/0010420 A1 | 1/2003 | Morrow | | |
| 2003/0014895 A1* | 1/2003 | Lizotte | ............... | B23K 26/04 42/1.01 |
| 2003/0019854 A1* | 1/2003 | Gross | ............... | B23K 26/067 219/121.73 |
| 2003/0123040 A1 | 7/2003 | Almogy | | |
| 2003/0147443 A1 | 8/2003 | Backus | | |
| 2003/0168434 A1* | 9/2003 | Gross | ............... | B23K 26/0626 219/121.7 |
| 2003/0174741 A1* | 9/2003 | Weingarten | ............ | H01S 3/1118 372/18 |
| 2003/0219056 A1* | 11/2003 | Yager | ............... | G03F 7/70025 372/57 |
| 2003/0219094 A1* | 11/2003 | Basting | ............... | G03F 7/70025 378/34 |
| 2004/0021054 A1* | 2/2004 | Bennett | ............... | G02B 26/06 250/201.9 |
| 2004/0027630 A1* | 2/2004 | Lizotte | ............... | B23K 26/04 359/15 |
| 2004/0028108 A1* | 2/2004 | Govorkov | ............ | H01S 3/2316 372/70 |
| 2004/0066825 A1* | 4/2004 | Hayashikawa | ............ | H01S 3/03 372/55 |
| 2004/0104270 A1 | 6/2004 | Acosta | | |
| 2004/0119979 A1* | 6/2004 | Duarte | ............... | G01J 1/08 356/443 |
| 2004/0179570 A1* | 9/2004 | Vitruk | ............... | H01S 3/0315 372/55 |
| 2004/0202220 A1* | 10/2004 | Hua | ............... | H01S 3/225 372/57 |
| 2004/0228004 A1* | 11/2004 | Sercel | ............... | B23K 26/0608 359/668 |
| 2004/0232125 A1* | 11/2004 | Clauer | ............... | B23K 26/0069 219/121.73 |
| 2005/0013328 A1* | 1/2005 | Jurgensen | ............ | B23K 26/0604 372/6 |
| 2005/0056626 A1* | 3/2005 | Gross | ............... | B23K 26/067 219/121.77 |
| 2005/0059265 A1* | 3/2005 | Im | ............... | H01L 21/2636 438/795 |
| 2005/0068538 A1* | 3/2005 | Rao | ............... | H01S 3/2366 356/451 |
| 2005/0092722 A1* | 5/2005 | Dane | ............... | B23K 26/032 219/121.73 |
| 2005/0094684 A1* | 5/2005 | Hermann | ............ | B23K 26/0626 372/26 |
| 2005/0094697 A1 | 5/2005 | Armier et al. | | |
| 2005/0107773 A1* | 5/2005 | Bergt | ............... | B23K 26/0635 606/4 |
| 2005/0111496 A1* | 5/2005 | Reeder | ............... | H01S 3/0606 372/9 |
| 2005/0111500 A1* | 5/2005 | Harter | ............... | H01S 5/5045 372/25 |
| 2005/0111514 A1* | 5/2005 | Matsumoto | ......... | G02B 27/0988 372/103 |
| 2005/0157762 A1* | 7/2005 | DeMaria | ............ | B23K 26/0604 372/9 |
| 2005/0190809 A1* | 9/2005 | Petersen | ............... | H01S 3/005 372/55 |
| 2005/0202611 A1* | 9/2005 | Mitsuhashi | ......... | B23K 26/0604 438/166 |
| 2005/0205778 A1* | 9/2005 | Kitai | ............... | B23K 26/0003 250/309 |
| 2005/0220164 A1* | 10/2005 | Mori | ............... | H01S 3/081 372/92 |
| 2005/0226286 A1* | 10/2005 | Liu | ............... | H01S 3/06712 372/25 |
| 2005/0226287 A1* | 10/2005 | Shah | ............... | G01J 11/00 372/25 |
| 2006/0044981 A1* | 3/2006 | Egawa | ............... | B23K 26/06 369/53.24 |
| 2006/0061854 A1* | 3/2006 | Dane | ............... | B23K 26/0069 359/333 |
| 2006/0092522 A1* | 5/2006 | Lizotte | ............... | H01S 3/005 359/637 |
| 2006/0092995 A1* | 5/2006 | Frankel | ............... | H01S 3/105 372/18 |
| 2006/0108097 A1 | 5/2006 | Hodes et al. | | |
| 2006/0114947 A1* | 6/2006 | Morita | ............... | H01S 3/07 372/22 |
| 2006/0114956 A1* | 6/2006 | Sandstrom | ......... | H01S 3/08009 372/55 |
| 2006/0161381 A1 | 7/2006 | Jetter | | |
| 2006/0191063 A1 | 8/2006 | Elkins et al. | | |
| 2006/0227841 A1* | 10/2006 | Savich | ............... | H01S 3/0608 372/69 |
| 2006/0245084 A1* | 11/2006 | Brustle | ............... | B23K 26/046 359/744 |
| 2006/0249491 A1* | 11/2006 | Jurgensen | ............ | B23K 26/0639 219/121.69 |
| 2006/0266742 A1* | 11/2006 | Hall | ............... | B23K 26/0656 219/121.69 |
| 2006/0287697 A1 | 12/2006 | Lennox | | |
| 2007/0029289 A1* | 2/2007 | Brown | ............... | B23K 26/0639 219/121.6 |
| 2007/0030875 A1* | 2/2007 | Takazane | ............ | B23K 26/032 372/55 |
| 2007/0086493 A1* | 4/2007 | Apolonski | ............ | H01S 3/1112 372/18 |
| 2007/0098024 A1* | 5/2007 | Mitchell | ............... | H01S 3/09415 372/10 |
| 2007/0138151 A1 | 6/2007 | Tanaka et al. | | |
| 2007/0177260 A1* | 8/2007 | Kuppenheimer | .. | G02B 27/0018 359/399 |
| 2007/0205186 A1* | 9/2007 | Kitai | ............... | B23K 26/00 219/121.73 |

(56) References Cited

U.S. PATENT DOCUMENTS

| | | |
|---|---|---|
| 2007/0235458 A1 | 10/2007 | Hewkin |
| 2007/0247499 A1 | 10/2007 | Anderson et al. |
| 2007/0295974 A1* | 12/2007 | Fontanella ......... B23K 26/0604 257/88 |
| 2008/0042042 A1* | 2/2008 | King .................... F41H 13/005 250/201.9 |
| 2008/0043791 A1 | 2/2008 | Miyajima et al. |
| 2008/0043799 A1* | 2/2008 | Egawa ................... H01S 3/036 372/59 |
| 2008/0094636 A1* | 4/2008 | Jin ..................... G02B 6/02328 356/466 |
| 2008/0253415 A1* | 10/2008 | Livingston ......... G02B 27/0905 372/38.01 |
| 2008/0253417 A1* | 10/2008 | Livingston ......... B23K 26/0613 372/38.02 |
| 2008/0279247 A1* | 11/2008 | Scholz ..................... H01S 3/03 372/65 |
| 2008/0297912 A1* | 12/2008 | Baldwin ............ G02B 27/0068 359/668 |
| 2009/0010285 A1 | 1/2009 | Dubois et al. |
| 2009/0027753 A1* | 1/2009 | Lizotte .............. G02B 27/0927 359/238 |
| 2009/0185176 A1* | 7/2009 | Livingston ............ H01S 3/1305 356/237.2 |
| 2009/0185590 A1* | 7/2009 | Livingston ............ H01S 3/2308 372/29.023 |
| 2009/0188901 A1* | 7/2009 | Dantus ................. B23K 26/032 219/121.76 |
| 2009/0207478 A1* | 8/2009 | Oron ..................... G02F 1/3523 359/297 |
| 2009/0245318 A1 | 10/2009 | Clifford, Jr. |
| 2009/0312676 A1 | 12/2009 | Rousso et al. |
| 2009/0323739 A1* | 12/2009 | Elliott ................ B23K 26/0732 372/24 |
| 2009/0323753 A1 | 12/2009 | Gmeiner et al. |
| 2010/0132817 A1 | 6/2010 | Hewkin |
| 2010/0206882 A1 | 8/2010 | Wessels et al. |
| 2010/0220750 A1* | 9/2010 | Brownell ................ H01S 1/005 372/4 |
| 2010/0254415 A1* | 10/2010 | Oh ....................... H01S 3/08009 372/20 |
| 2011/0032602 A1* | 2/2011 | Rothenberg ....... G02B 6/02042 359/341.1 |
| 2011/0032603 A1* | 2/2011 | Rothenberg ........ H01S 3/06754 359/341.1 |
| 2011/0032604 A1* | 2/2011 | Rothenberg ....... G02B 6/02042 359/341.4 |
| 2011/0043899 A1* | 2/2011 | Erlandson .......... G02B 27/0966 359/347 |
| 2011/0097906 A1* | 4/2011 | Kwon .................. B23K 26/063 438/795 |
| 2011/0102537 A1 | 5/2011 | Griffin et al. |
| 2011/0127241 A1* | 6/2011 | Rumsby ............. B23K 26/0626 219/121.62 |
| 2011/0127697 A1* | 6/2011 | Milne ................... B23K 26/046 264/400 |
| 2011/0128500 A1* | 6/2011 | Bille ..................... A61B 5/0062 351/221 |
| 2011/0227972 A1 | 9/2011 | Taniguchi et al. |
| 2011/0253690 A1* | 10/2011 | Dane .................. G02B 27/0927 219/121.74 |
| 2011/0255088 A1* | 10/2011 | Dane .................. G02B 27/0927 356/370 |
| 2011/0259631 A1* | 10/2011 | Rumsby ............. B23K 26/0613 174/264 |
| 2011/0266264 A1* | 11/2011 | Rumsby .................. B23K 26/06 219/121.72 |
| 2011/0286480 A1* | 11/2011 | Bayramian ............. H01S 3/005 372/33 |
| 2012/0106083 A1 | 5/2012 | Toftloekke et al. |
| 2014/0204713 A1 | 7/2014 | Armbruster et al. |
| 2014/0224778 A1 | 8/2014 | Armbruster et al. |

FOREIGN PATENT DOCUMENTS

| | | |
|---|---|---|
| DE | 10125447 A1 | 1/2002 |
| EP | 0157546 A2 | 10/1985 |
| EP | 0427229 A3 | 5/1991 |
| EP | 1184946 A1 | 3/2002 |
| EP | 2565673 A1 | 3/2012 |
| GB | 1495477 A | 12/1977 |
| GB | 2211019 A | 6/1989 |
| GB | 2249843 A | 5/1992 |
| GB | 2304641 A | 3/1997 |
| JP | 63094695 A | 4/1988 |
| JP | 5129678 A | 5/1993 |
| JP | 2001276986 A | 10/2001 |
| JP | 2007032869 A | 2/2007 |
| JP | 2007212118 A | 8/2007 |
| JP | 2011156574 A | 8/2011 |
| WO | 0046891 A1 | 8/2000 |
| WO | 0107865 A2 | 2/2001 |
| WO | 0243197 A2 | 5/2002 |
| WO | 2013034210 A1 | 3/2013 |

OTHER PUBLICATIONS

U.S. Appl. No. 14/342,508, Office Action dated Aug. 14, 2014.
U.S. Appl. No. 14/342,503, Office Action dated Aug. 21, 2014.
U.S. Appl. No. 14/342,487, Office Action dated Aug. 14, 2014.
U.S. Appl. No. 14/342,483, Office Action dated Oct. 2, 2014.
U.S. Appl. No. 14/342,493, Office Action dated Nov. 19, 2014.
Final Office Action for U.S. Appl. No. 14/342,487, dated Feb. 2, 2015, 31 pages.
Notice of Allowance and Fee(s) Due for U.S. Appl. No. 14/342,510, dated Feb. 20, 2015, 20 pages.
Notice of Allowance and Fee(s) Due for U.S. Appl. No. 14/342,503, dated Mar. 17, 2015, 11 pages.
Notice of Allowance and Fee(s) Due for U.S. Appl. No. 14/342,508, dated Apr. 1, 2015, 15 pages.
Notice of Allowance and Fee(s) Due for U.S. Appl. No. 14/342,483, dated Apr. 2, 2015, 26 pages.
Final Office Action for U.S. Appl. No. 14/342,493, dated Apr. 21, 2015, 25 pages.
U.S. Appl. No. 14/342,508, Final Office Action dated Dec. 10, 2014, 23 pages.
International Application No. PCT/EP2012/003073, Preliminary Report on Patentability, Sep. 26, 2013, 14 pages.
International Application No. PCT/EP2012/003072, Preliminary Report on Patentability, Mar. 12, 2014, 7 pages.
International Application No. PCT/EP2012/003071, Preliminary Report on Patentability, Mar. 12, 2014, 5 pages.
International Application No. PCT/EP2012/003070, Preliminary Report on Patentability, Mar. 12, 2014, 7 pages.
International Application No. PCT/EP2012/003069, Preliminary Report on Patentability, Nov. 27, 2013, 32 pages.
International Application No. PCT/EP2012/003068, Preliminary Report on Patentability, Mar. 12, 2014, 5 pages.
International Application No. PCT/EP2012/003067, Preliminary Report on Patentability, Nov. 28, 2013, 19 pages.
International Application No. PCT/EP2012/003066, Preliminary Report on Patentability, Nov. 28, 2013, 19 pages.
International Application No. PCT/EP2012/003065, Preliminary Report on Patentability, Nov. 28, 2013, 21 pages.
International Application No. PCT/EP2012/003064, Preliminary Report on Patentability, Nov. 15, 2013, 18 pages.
International Application No. PCT/EP2012/003063, Preliminary Report on Patentability, Mar. 12, 2014, 5 pages.
International Application No. PCT/EP2012/003062, Preliminary Report on Patentability, Mar. 12, 2014, 6 pages.
International Application No. PCT/EP2012/003061, Preliminary Report on Patentability, Mar. 12, 2014, 6 pages.
International Application No. PCT/EP2012/003073, Search Report and Written Opinion, Dec. 18, 2012, 8 pages.
International Application No. PCT/EP2012/003072, Search Report and Written Opinion, Oct. 8, 2012, 11 pages.

(56) References Cited

OTHER PUBLICATIONS

International Application No. PCT/EP2012/003071, Search Report and Written Opinion, Nov. 15, 2012, 9 pages.
International Application No. PCT/EP2012/003070, Search Report and Written Opinion, Oct. 8, 2012, 11 pages.
International Application No. PCT/EP2012/003069, Search Report and Written Opinion, Sep. 27, 2012, 8 pages.
International Application No. PCT/EP2012/003068, Search Report and Written Opinion, Nov. 15, 2012, 8 pages.
International Application No. PCT/EP2012/003067, Search Report and Written Opinion, Nov. 16, 2012, 7 pages.
International Application No. PCT/EP2012/003066, Search Report and Written Opinion, Nov. 15, 2012, 7 pages.
International Application No. PCT/EP2012/003065, Search Report and Written Opinion, Nov. 16, 2012, 7 pages.
International Application No. PCT/EP2012/003064, Search Report and Written Opinion, Nov. 16, 2012, 7 pages.
International Application No. PCT/EP2012/003063, Search Report and Written Opinion, Nov. 15, 2012, 9 pages.
International Application No. PCT/EP2012/003062, Search Report and Written Opinion, Nov. 15, 2012, 10 pages.
International Application No. PCT/EP2012/003061, Search Report and Written Opinion, Sep. 10, 2012, 9 pages.
U.S. Appl. No. 14/342,503, Final Office Action dated Dec. 18, 2014, 22 pages.
Office Action for U.S. Appl. No. 14/342,487, dated Jul. 24, 2015, 17 pages.
Notice of Allowance and Fee(s) Due for U.S. Appl. No. 14/342,493, dated Jun. 24, 2015, 11 pages.
Office Action for U.S. Appl. No. 14/342,494, dated Oct. 2, 2015, 47 pages.
Notice of Allowance and Fee(s) Due for U.S. Appl. No. 14/342,487, dated Nov. 23, 2015, 47 pages.
Office Action for U.S. Appl. No. 14/342,481, dated Oct. 6, 2015, 77 pages.
Office Action for U.S. Appl. No. 14/342,477, dated Oct. 7, 2015, 74 pages.
Office Action for U.S. Appl. No. 14/342,495, dated Oct. 6, 2015, 77 pages.
Notice of Allowance and Fee(s) Due for U.S. Appl. No. 14/342,494, dated Feb. 10, 2016, 28 pages.
Final Office Action for U.S. Appl. No. 14/342,477, dated Mar. 22, 2016, 17 pages.
Final Office Action for U.S. Appl. No. 14/342,495, dated Apr. 12, 2016, 25 pages.
Final Office Action for U.S. Appl. No. 14/342,481, dated Apr. 26, 2016, 24 pages.
U.S. Appl. No. 14/342,505, Office Action 1 dated Jun. 3, 2016, 83 pages.
U.S. Appl. No. 14/342,504, Office Action 1 dated Jun. 22, 2016, 81 pages.
U.S. Appl. No. 14/342,481, Office Action 2 dated Aug. 17, 2016, 24 pages.
U.S. Appl. No. 14/342,495, Office Action 2 dated Aug. 17, 2016, 22 pages.
U.S. Appl. No. 14/342,477, Office Action 2 dated Aug. 18, 2016, 27 pages.
U.S. Appl. No. 14/342,505, Final Office Action 1 dated Nov. 14, 2016, 19 pages.
U.S. Appl. No. 14/342,504, Final Office Action 1 dated Nov. 17, 2016, 19 pages.
U.S. Appl. No. 14/342,481, Notice of Allowance dated Dec. 5, 2016, 12 pages.
U.S. Appl. No. 14/342,495, Notice of Allowance dated Dec. 8, 2016, 14 pages.
U.S. Appl. No. 14/342,477, Notice of Allowance dated Dec. 22, 2016, 19 pages.

* cited by examiner

MARKING APPARATUS WITH A PLURALITY OF GAS LASERS WITH RESONATOR TUBES AND INDIVIDUALLY ADJUSTABLE DEFLECTION MEANS

FIELD OF THE INVENTION

The present invention relates to a marking apparatus for marking an object with laser light.

RELATED ART

Generally, marking apparatuses are known which deploy a single gas laser, e.g. a $CO_2$ laser. Such a laser emits a light beam which is delivered to the object to be marked. The object is moved relative to the marking apparatus on a conveyor belt. Typically, a scanning device is provided for directing the light beam on the object according to a sign to be marked. As a high throughput of objects is generally desired, the speed of the object on the conveyor belt relative to the marking apparatus should be as high as possible. However, the speed cannot be arbitrarily increased since the scanning device requires sufficient time to write the mark on the object as it passes. Hence, the speed of such marking devices is limited by the speed of the scanning devices.

The throughput can be further increased with generic marking apparatuses that comprise a plurality of gas lasers and a control unit for individually activating each of the gas lasers to emit a laser beam according to a sign to be marked. Such marking apparatuses are described in U.S. Pat. Nos. 5,229,573 and 5,229,574.

For achieving ever greater marking speeds, marking apparatuses with a larger numbers of gas lasers are demanded. However, the number of gas lasers employed is hitherto strongly restricted as the size of the individual lasers leads to unduly large apparatuses and also hampers the laser beam delivery to the object to be marked.

Simply decreasing the size of the gas lasers by deploying shorter laser tubes is not an option since the output power of the laser beams strongly depends on the length of the laser tubes. By arranging several laser tubes of one gas laser in a folded design some space reductions are feasible. However, a folded design still entails considerable drawbacks, such as complicated heat dissipation.

From U.S. Pat. No. 4,727,235 a marking apparatus comprising a plurality of lasers is known. The lasers are preferably $CO_2$ lasers. Their emitted beams are directed to a marking area with a beam delivery tube containing mirrors.

U.S. Pat. No. 5,115,446 describes a carrying structure for components of a gas laser. The resonator tubes surround an inner area in which a compressor and cooling frames are accommodated.

Subject-matter of U.S. Pat. No. 4,652,722 is an apparatus for inscribing characters onto moving articles. The apparatus comprises a number of lasers, each having an associated mirror which is initially adjusted to direct the respective laser beam onto the article.

SUMMARY OF THE INVENTION

It is an object of the invention to provide a marking apparatus comprising a plurality of gas lasers with low space requirements, wherein each gas laser provides a laser beam that can be easily redirected to an object to be marked.

This object is solved with a marking apparatus.

Embodiments are given in the following description, in particular in connection with the attached figures.

According to embodiments of the invention, the marking apparatus of the above mentioned kind is characterized in that the gas lasers are stacked such that the laser beams emitted by the gas lasers form an array of laser beams, in particular a linear array with parallel laser beams, each gas laser comprises laser tubes that at least partially surround an inner area, the apparatus further comprises, beam-delivery means for directing the array of laser beams into the inner area and a set of deflection means for rearranging the array of laser beams into a desired array of laser beams, the set of deflection means is arranged in the inner area and comprises at least one deflection means per laser beam, in particular at least one mapping mirror or one optical waveguide per laser beam, and each deflection means is individually adjustable in its deflection direction and/or individually shiftable.

An idea of the invention resides in the provision of a central space surrounded by laser tubes which form a closed or open ring. By stacking the lasers, this results in the central space being large enough to accommodate optical elements such as the set of deflection means.

It can be seen as an advantage of the invention that cooling of the laser tubes is facilitated in that those laser tubes that are arranged on opposing sides of the closed or open ring are at a maximum distance to each other, while at the same time the overall dimensions of the apparatus are not increased, as optical elements are space-savingly accommodated in the inner area.

It can be regarded as an idea of the invention to provide for at least one deflection means per light beam for individually deflecting each beam. That means each light beam is directed to its respective deflection means. The deflection means are adjustable independent from one another such that basically any desired configuration can be set.

The light beams emitted by the gas lasers, i.e. the laser beams, form a specific arrangement, e.g., a linear arrangement of light beams running in parallel. It can be seen as an advantage of the invention to allow for a flexible mapping of the linear arrangement into any other arrangement. In particular, the spacing between the light beams may be changed or reduced with the set of deflection means.

An idea of the invention resides in the provision of adjustable deflection means. These may be set to a desired position during or prior to the operation of the marking device. To this purpose, each deflection means may be displaced by an electrical motor which is controlled by the control unit.

As opposed to prisms, the set of deflections means may cause less distortion, particularly when mirrors are employed as deflection means.

In case of the deflection means being mirrors, the adjustment may be carried out by individually tilting the mirrors, i.e., changing the deflection directions or pointing directions of the mirrors. Additionally or alternatively, the mirrors may be displaceable, that is shiftable. As the laser beams can be re-arranged with the mirrors, the latter can also be referred to as mapping mirrors.

In the context of embodiments of the invention, the activation of each of the gas laser to emit a laser beam may be understood as any process that controls whether a light beam impinges on the object to be marked. Hence, the activation may also be carried out via a beam shutter. That is, a gas laser stays activated and a beam shutter controls the passing or blocking of the laser beam of the gas laser.

The gas lasers may be of any generally known kind, such as HeNe lasers, CO lasers, Argon lasers, nitrogen lasers, or excimer lasers. The gas lasers may be $CO_2$ lasers. These may be operated as c.w. or pulsed, e.g. by Q-switching or mode-locking.

The sign that is to be marked may be understood as any mark, e.g. a character, a picture or single pixels of a graphic. The sign may consist of a number of dots or lines. That is, the gas lasers may be activated for short periods to produce dots on the object or for a settable time span to cause lines of a certain length.

In the context of the invention, the object to be marked may be any item or product with a surface that can be affected with the light of the gas lasers. In particular, the object may be a packaging, e.g. for food or beverage, a fruit or a label. The material of the object may comprise plastics, paper, metals, ceramics, fabrics, composites or organic tissues.

The marking itself may be any change in the object's surface, e.g. a color change, an engraving or a cut.

The aforementioned "desired array of laser beams" may be any arrangement of laser beams suited for the respective application. The desired array may be different to the original array of light beams, i.e. the arrangement prior to impinging on the set of deflection means. In particular, the desired array may be a linear arrangement that is rotated relative to the original array.

Basically, the array of laser beams as emitted by the gas lasers may have any form. Though in some cases not preferred, it is generally possible that the laser beams of different lasers are emitted at different sides or corners of the stacked lasers. However, in a design all laser beams are emitted at the same corner of the stack of gas lasers.

The beam-delivery means for directing the laser beams into the inner area may be any means that cause the emitted light beams to enter the inner area between the laser tubes. While the beam-delivery means may be constituted by a set of mirrors, it is generally also possible that the beam-delivery means are formed by the output coupler mirrors of the gas lasers or by optical fibers.

According to an embodiment of the invention, the deflection means are adjusted such that a beam separation between the laser beams is reduced. The disadvantages of large beam separations due to large dimensions of the gas lasers may then be mitigated. Furthermore, a high marking resolution can be achieved. In contrast to devices for reducing the beam separation in which all light beams are directed onto a common optical element, e.g., a suitable prism, the deflection means of the inventive apparatus lead to less distortion of the light beams.

Another embodiment of the invention is characterized in that the set of deflection means comprises a first and a second set of mapping mirrors, each set of mapping mirrors comprises at least one mapping mirror per laser beam, and the first set of mapping mirrors directs the laser beams onto the second set of mapping mirrors. Hence, each light beam is individually directed via at least two mapping mirrors. This allows for a particularly flexible rearrangement of the light beams.

Generally, it is possible that the deflection means are manually adjustable, in particular displaceable. However it may be preferred that the control unit is adapted for shifting the deflection means and/or adjusting the deflection directions of the deflection means, in particular via gimbal mounts. For broad fields of application, each of the deflection means may be individually adjustable by the control unit. In a comparably cost-effective implementation, at least one deflection means per laser beam is adjustable by the control unit. Gimbal mounts may allow for rotations of the mounted deflection means in at least two rotational degrees of freedom or even in all directions.

The adjustment of the deflection means by the control unit allows for a variable code positioning. That means, the direction of the laser beams emanating from the apparatus can be altered to change a position of a code to be produced with the laser beams on the object. Additionally a code height can be varied.

Furthermore, a static marking is possible. In this, the object is not moved relative to the marking apparatus for the whole marking operation. The deflection means are operated to cause a scanning movement of the laser beams such that all signs to be printed are successively produced on the resting object. This embodiment may be preferred for printing 2D graphics which require a high printing resolution.

The control unit may be further adapted to provide a multiple-strike option. If the laser beams are pulsed, this means that a plurality of pulses is directed onto a common spot on the object. This may be accomplished by making use of a relative movement between the object and the apparatus and by timing the firing of the lasers appropriately. Alternatively, the adjustment of the deflection means of one laser beam may be altered such that successive pulses of one gas laser are directed onto the common spot. A grey-scale printing is thus made possible.

The control unit may be further adapted to provide a high-power option. The adjustment of the deflection means of one or more laser beams may be altered such that the output of one or more gas lasers are directed onto a common spot. In this way, materials that require a higher power than a single laser can provide may still be marked.

The control unit may be further adapted to automatically adjust the deflection means to positional changes of the object, e.g. to compensate for vibrations of the object. The positional changes may be determined by a sensor such as ultrasonic or optical means or a proximity switch.

An embodiment of the inventive apparatus is characterized in that at least one scanning mirror device is provided which comprises a common mirror onto which all laser beams coming from the set of deflection means impinge, and the control unit is adapted for pivoting the scanning mirror device, in particular via a galvanometer.

A scanning mirror device may be understood as any instrument that causes a light beam to pass sequentially a number of spatial positions.

In simple cases, such devices may comprise a rotatable mirror which is rotatable around an axis normal to the plane of the incident light beam. The rotatable mirror may comprise a mirror drum, i.e., a polygon with a number or mirrors that are rotated together around a single axis.

Devices comprising a galvanometer to which a mirror is connected are generally referred to as galvanometer scanners. A galvanometer scanner may convert input electric signals into an angular position of the mirror of the galvanometer scanner, for example with a moving coil or a solid iron rotor.In some embodiments, any location to which the reflected light beam is directed may be addressed independent from the previous position of the light beam. At least two galvanometer scanners may be provided. When the galvanometer scanners are arranged such that each laser beam is directed from the first galvanometer scanner to the second galvanometer scanner, any two-dimensional scanning movement is possible.

The tasks of the scanning mirror device may also be executed with acousto-optical devices. In these, an acoustic wave is coupled into an acousto-optic material. The frequency of the acoustic wave governs the angle of deflection of a laser beam travelling through the acousto-optic material. By rapidly altering the frequency of the acoustic wave, a fast scanning motion of the laser beam can be achieved.

For marking the object while it is moving relative to the marking apparatus, in another embodiment the control unit is adapted to adjust the deflection means and/or the at least one scanning mirror device according to information on a movement of the object. The object can thus be chased or tracked. It is possible to speed up or slow down a relative movement between the apparatus and the conveying unit moving the object. The speed of the marking process can thus be increased.

According to still another embodiment of the invention, the first and the second set of mapping mirrors are each arranged in a linear array; and each mapping mirror is tiltable. In this embodiment, the pitch between the mapping mirrors of one of the sets of mapping mirrors may be fixed, which allows for employing a common mounting means that holds the mapping mirrors in the linear arrangement, while tilting of the mirrors is still possible. The second set of mapping mirrors may be tilted out of a plane formed by the laser beams that impinge on the first set of mapping mirrors. Positioning means for adjusting the position of at least one of the linear arrays of mapping mirrors may be provided. In particular, the positioning means may displace the common mounting means.

Another embodiment of the inventive apparatus is characterized in that the control unit is adapted for controlling the deflection means to set a degree of convergence or divergence of the laser beams emanating from the deflection means, in particular from the second set of deflection means. The deflection means can thus be adjusted such that a desired pitch between the laser beams is caused at a given distance from the apparatus. The height of a character produced by the laser beams as well as the printing resolution, i.e., the distance between markings caused by neighbouring laser beams on the object, are governed by the separation of the laser beams and can thus also be varied by adjusting the degree of convergence. To this end a fast tilting of the deflection means suffices and there is no need for changing the distance between the deflection means which might be more time consuming.

The gas lasers may be arranged such that the laser beams exit the gas lasers in parallel and form a linear arrangement. However, depending on the application, it may be desired to change the orientation of that linear arrangement of laser beams. To this end, the control unit may be adapted to adjust the deflection means such that a linear arrangement of laser beams impinging on the deflection means is rotated, e.g. by 90°, about an axis parallel to the direction of travel of the impinging laser beams. A horizontal arrangement can thus be rotated to a vertical arrangement or vice versa. This may be advantageous as usually signs or characters are to be printed onto the product in either a horizontal or a vertical direction. Hence, the control unit can switch at least between these two important cases. For rotating the linear arrangement of laser beams, the set of deflection means may comprise a first set of mapping mirrors which is used together with at least one or two scanning mirror devices.

According to still another embodiment of the invention, a telescopic device with at least two lenses is provided for global adjustment of the focal lengths of the laser beams. The global adjustment may be understood such that all laser beams of the gas lasers run through the telescopic device and are thus affected in the same way. The control unit may be adapted to set the telescopic device according to the distance of the object, in particular such that the focal lengths of the laser beams correspond to the distance to the object. Spot sizes of markings produced on the object can be held constant while the object is approaching or moving away from the apparatus. Information on the distance to the object may be supplied to the control unit either from a conveying unit that moves the object and/or by deploying generally known distance measuring means. The telescopic device is arranged behind the deflection means, as the maximum beam separation between any two laser beams may be reduced by the deflection means. Optical elements of the telescopic means may thus be built smaller.

According to another embodiment of the invention, the control unit is adapted to delay the activation of each gas laser individually such that, in the case of an object moving relative to the marking apparatus in an object movement direction, at least two laser beams impinge on the object at the same position in the object movement direction. The timing of the activation of the gas lasers may be such that all laser beams impinge on the object at the same position in the object movement direction.

Furthermore, regardless of the orientation between the emanating laser beams and the object movement direction, the different laser beams may cause marking spots in a line which is perpendicular to the object movement direction. The length of the line depends on the orientation between the emanating laser beams and the object movement direction.

Another embodiment of the invention is characterized in that each deflection means is an optical waveguide. The optical waveguides may be any flexible waveguides that guide light with the wavelengths emitted by the gas lasers, in particular infrared light with a wavelength of about 10 µm. Examples of optical waveguides are optical fibers or hollow tubes with a reflective inner surface.

Each optical waveguide may be equipped with input coupling optics for directing the impinging laser beam into a core of the optical waveguide in a proper angle. The optical waveguides may also be equipped with output coupling optics comprising in particular at least two lenses for collecting the laser radiation leaving the waveguide. The output coupling optics may determine the laser beam size, focal length and depth of focus. In particular, the output coupling optics may be formed as telescopic means.

The optical waveguides may have the same length. This leads to the spot size and quality of markings caused on the object being more consistent.

In the following, variants of the gas lasers and the arrangement of the gas lasers within the marking apparatus will be described.

Each gas laser comprises excitation means for exciting the gas in the laser tubes to generate laser light. Excitation means may be provided at each laser tube.

The tubes of each gas laser form a common space, which may also be referred to as a resonator. The tubes may in particular be straight tubes, that is, they have a longitudinal axis extending along a straight line, and corner areas are formed between adjacent tubes. Therefore, the form of the resonator of one laser may also be described as an angular ring, which may either be a closed ring in the form of a loop or an open ring having spacing between two of the tubes.

The angle which is formed between each two adjacent resonator tubes of a laser may be greater than in a typical folded design of the laser. It may be preferred that the angle is greater than 60° which eases the access and manufacture of the gas lasers.

One idea of the invention is to provide a marking apparatus with an array of gas lasers stacked on top of each other so as to provide a monolithic linear array. The linear array provides a plurality of laser beams for printing dots or lines of code. Therefore, the gas lasers constitute a basic building block of a multi-beam laser.

It may be preferred that the gas lasers are basically two-dimensional structures or flat units in which the resonator tubes are arranged in a single layer. The two-dimensional form of the gas lasers as the core building blocks of the marking apparatus allows for stacking of the blocks and, thereby, creates an array.

In an embodiment of the invention the resonator tubes of each gas laser are arranged in the shape of an open or closed ring or circuit surrounding a free central space or an inner area between them. The power of the gas lasers is fundamentally determined by the length of the tubular space or resonator, which forms a cavity in which the laser light is reflected between a rear mirror at one end and a partially reflecting output coupler at the opposite end. The resonator is formed around a free central space, resulting in an increase in length of the resonator without increasing the overall length of the laser device, as compared to a linear resonator. Moreover, compared to a zig zag folding of the laser tubes, heat dissipation is facilitated as opposite laser tubes are spaced to form the free inner area. Thus space requirements can be reduced by omitting complex heat exchangers which are generally deployed with zig zag folded tubes. The overall space consumption of the inventive apparatus is not increased by forming a free inner area, as this space is used for housing optical elements.

Connecting elements are arranged in the corners between the resonator tubes and may thus be corner flanges connected to two adjacent tubes. The connecting elements house mirrors for coupling laser light between the resonator tubes.

In addition, each gas laser may comprise two end flanges connected to the resonator tubes at opposing axial ends of the common tubular space. One of the end flanges contains the output coupler and the other contains the rear mirror.

In an embodiment of the invention the resonator tubes of each laser are arranged in a triangular, rectangular, square or U-pattern. In any case, an inner area is at least partially surrounded by the resonator tubes. In a triangular pattern the resonator of the lasers includes three resonator tubes, whereas in the rectangular or square pattern the resonator is made-up of four resonator tubes. In other embodiments five or more resonator tubes per laser may be provided and arranged in a polygonal form. The inventive design of the lasers with a ring-like arrangement of the resonator tubes allows the geometry of the resonator to be optimized, for example to the power required and the volume limitation of the particular application. The U-pattern as an embodiment of an open ring or circuit provides easy access to the free central space via the opening in the ring. The U-pattern may be formed cornered with three or four straight resonator tubes. In any case the resonator length of each gas laser may be increased by arranging the tubes of the respective laser in the shape of a two-dimensional coil, or by providing a folded design of laser tubes at one or more sides limiting the inner area.

In another embodiment the resonator tubes of one laser are arranged in one plane. That is, the resonator tubes of the first laser are arranged in a first plane and the resonator tubes of a second laser are arranged in a second plane. The resonator tubes of each laser may be arranged in individual, separate planes. This may provide for a very compact and flat design of each laser. Therefore, the lasers can be easily stacked. The stacked arrangement of the flat lasers provides an array of individual lasers which permits to create a dot-matrix mark on an object to be marked. Due to the flat shape of the individual lasers, the distance between the individual laser beams may be kept small.

In another embodiment the lasers have equal forms or identically constructed. The equal form of the lasers allow for an easy stacking of the lasers in order to form a multi-beam marking apparatus. Neighbouring resonator tubes of adjacent lasers may have the same length.

The connecting elements or corner pieces of each laser may be stacked on top of each other and connected. However, in an embodiment the connecting elements are integrated into a common support structure formed in a corner area of the marking apparatus. This reduces cost and manufacturing time.

In an embodiment of the invention the laser tubes of each laser are arranged in a loop and each laser includes an integrated output flange connected between two laser tubes, the integrated output flange comprising the output coupler and the rear mirror of the respective laser.

The integrated output flange establishes a closed loop or ring of resonator tubes which enhances the stability and provides a particularly compact design. The integrated output flange may or may not provide a fluidic connection between the resonator tubes connected thereto.

The invention further relates to a marking system that comprises a marking apparatus as described above, and which further comprises pivoting means for tilting the marking apparatus relative to an object movement direction.

As will be explained subsequently, by tilting the marking apparatus, it is possible to alter the printing resolution, i.e. the distance between marking spots on the object in a direction perpendicular to an object movement direction. This is governed by the beam separation in the direction perpendicular to an object movement direction. A beam separation in the object movement direction is not detrimental to the printing resolution, as the activation of the lasers can be delayed until the object has moved by as much as the beam separation in the object movement direction.

It is then possible to change the beam separation in the direction perpendicular to an object movement direction by tilting the marking apparatus and thus the arrangement of laser beams. The control unit may be adapted to tilt the marking apparatus with the pivoting means according to a desired printing resolution.

In the case of a linear arrangement of laser beams, the tilt angle between the linear arrangement of laser beams and the object movement direction governs the distance between marking spots on the object in a direction perpendicular to the object movement direction. The distance between the marking spots is at a maximum if the linear arrangement of laser beams is perpendicular to the object movement direction. For setting a smaller distance, the tilt angle can be reduced. Together with properly timing the firing of the lasers, the tilt angle can be set such that the marking spots form a continuous line or separated marking spots. Overlapping marking spots may be produced to cause different intensities of marking spots, e.g. for grey-scale printing. Furthermore, the tilt angle can be zero, resulting in a complete overlap of the marking spots if a corresponding delay between the firing, i.e., activation of the gas lasers is chosen.

BRIEF DESCRIPTION OF THE DRAWINGS

A better understanding of the invention and various other features and advantages of the present invention will become readily apparent by the following description in connection with the drawings, which are shown by way of example only, and not limitation, wherein like reference numerals refer to substantially alike components.

DETAILED DESCRIPTION OF THE INVENTION

Figure 1:
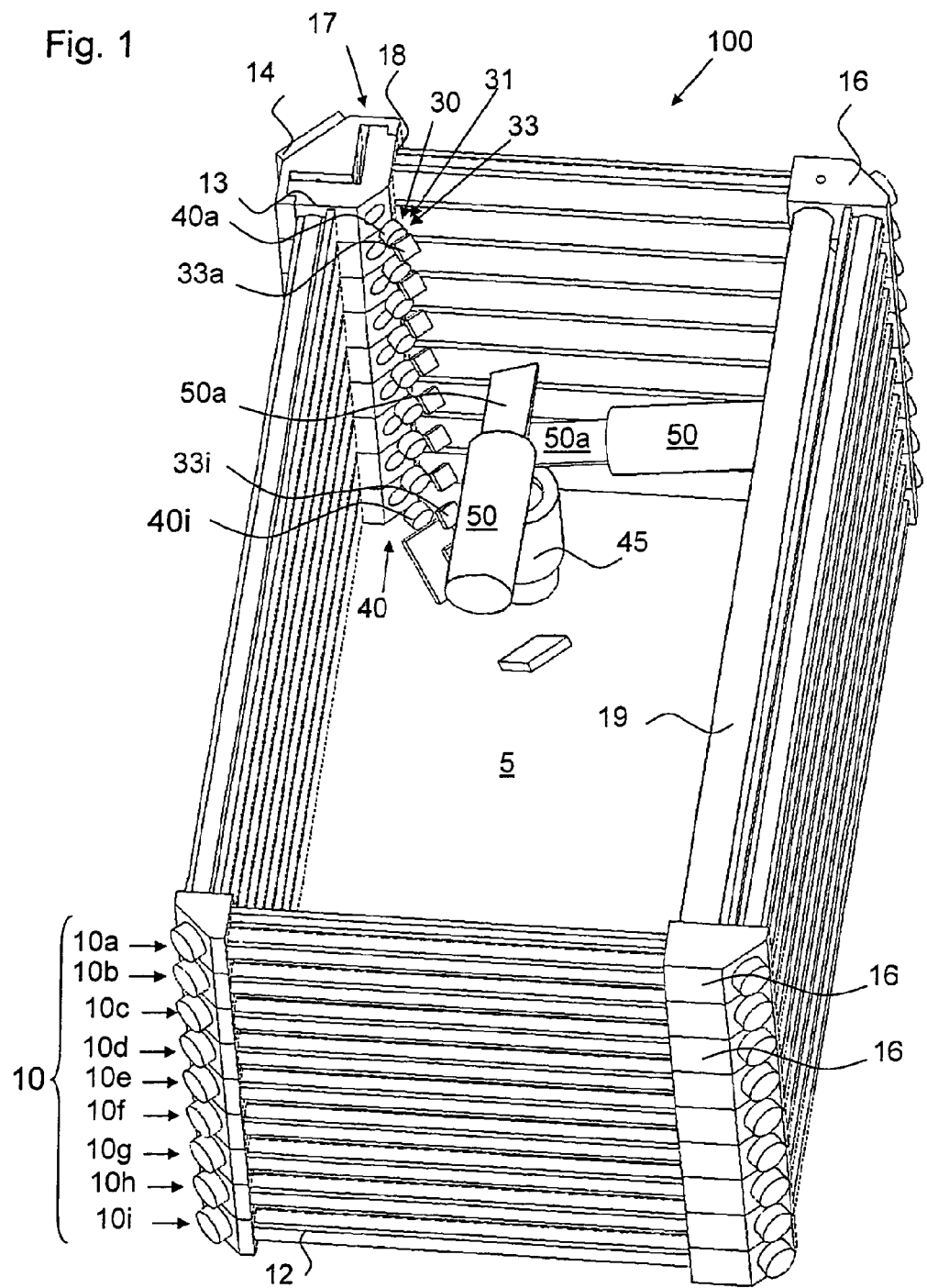
FIG. 1 shows a schematic diagram of a first embodiment of an inventive marking apparatus.

FIG. 1 shows schematically a first embodiment of a marking apparatus 100 according to the invention. The marking apparatus 100 comprises a plurality of gas lasers 10, each emitting a laser beam that is used to produce a marking on an object (not depicted). For forming and directing the laser beams, the apparatus 100 further comprises optical means 30, 40, 45, 50.

In the example shown, the plurality of gas lasers 10 consists of nine gas lasers 10a-10i. In general, a large number of gas lasers 10 is desirable, e.g., at least four or six lasers. Each gas laser 10 comprises resonator tubes 12 that are in fluidic connection to each other. That means, the resonator tubes 12 of one gas laser form a common resonator volume. It is also possible that the resonator tubes 12 of different lasers 10 are in fluidic connection.

In the depicted embodiment, the gas lasers are $CO_2$ lasers and the laser gas accordingly comprises, amongst others, $CO_2$, $N_2$ and He.

The resonator tubes 12 are arranged in the shape of a ring surrounding an inner area or free central space 5 between them. The ring is formed with connecting elements 16 for connecting adjacent resonator tubes 12 belonging to the same laser. The connecting elements 16 are arranged in the corners of the stacked lasers and house mirrors for reflecting laser light from one of the adjacent tubes 12 to the other. Naturally, all mirrors are selected dependent on the laser gas used. In the present case, the mirrors comprise a material reflective in the wavelength region of a $CO_2$ laser, i.e. medium-IR radiation, primarily at 10.6 μm. For example, a copper mirror and/or a substrate with a coating for increasing reflectivity and/or preventing tarnishing in air may be provided.

In the depicted example, the resonator tubes 12 form a sealed ring in the shape of a rectangle. In general, any other shape that at least partially encloses the inner area 5 may be chosen, such as a triangular, a square or a U-pattern.

The resonator tubes 12 of each gas laser 10a-10i constitute a sealed volume. The volumes of the lasers may be separated from each other or interconnected to form a common sealed volume. In sealed lasers, it is generally desired that the laser gas composition stays constant over a long period. To this end, the total gas volume is increased by an additional gas reservoir 19. The gas in the reservoir is not excited to generate laser light. Rather, the reservoir 19 is connected to the gas volumes of one or several resonator tubes 12.

The marking apparatus 100 further comprises excitation means (not depicted) at each resonator tube 12 and cooling blocks (not depicted) attached to the resonator tubes 12. There may be one cooling block per side of the cubic arrangement of resonator tubes 12. Thus, each cooling block does not merely cool a single resonator tube, but a plurality of resonator tubes 12 of different lasers 10a-10i. The cooling blocks may have a plurality of channels through which a cooling fluid can circulate.

The resonator tubes 12 of each laser 10 are arranged in individual, separate flat layers. The lasers 10 are substantially identical and are stacked on top of each other in a parallel manner. The lasers 10 are connected to each other by suitable connecting means, such as bolts, screws or the like.

The rectangular shape of the lasers 10 may be open at one corner. In the depicted embodiment this is the top left corner at which an integrated output flange 17 is provided. At this corner, the laser volume is terminated by a rear mirror 18 for reflecting laser light back inside the tubes 12. The rear mirror 18 may be connected to an end tube 12 which is supported by the integrated output flange 17, or the rear mirror 18 may be attached to the integrated output flange 17.

The other end of the laser volume is terminated at the same corner by an output coupler 13. The output coupler 13 couples out a laser beam and may again be connected to either an end tube 12 or the integrated output flange 17. The output coupler 13 may be a partially reflecting mirror 13 and may also be referred to as partially reflecting output coupler. The emitted laser beams are then directed into the inner area 5 with beam delivery means 14. In the embodiment shown, the beam delivery means 14 comprise at least one mirror 14 arranged at the integrated output flange 17. The laser beams reflected from the beam delivery means 14 enter the inner area 5 through a hole in the integrated output flange 17. Generally it is possible that a common integrated output flange 17 for all lasers 10 is provided. In the depicted embodiment, however, there is one integrated output flange 17 per laser 10 and each integrated output flange 17 exhibits one beam delivery means 14 and one hole through which a respective laser beam can pass.

In the inner area 5, optical means 30, 40, 45, 50 for shaping and deflecting the laser beams are provided. This arrangement may lead to comparably low space requirements. Simultaneously, opposing laser tubes 12 of one laser are separated by the inner area 5 which facilitates cooling of the tubes 12.

The laser beams coming from the beam delivery means 14 impinge on a set of beam shaping means 40 for refocusing the laser beams. The set of beam shaping means comprises one beam shaping means 40a-40i for each laser beam. Thus, the focuses of the laser beams can be set independently from each other. Depicted is one lens per beam shaping means 40a-40i. However, each beam shaping means may comprise at least two optical elements, e.g. mirrors or lenses, which form a telescopic means. Adjusting the focal lengths of the laser beams may then require only minor displacements of the optical elements of the telescopic means.

The laser beams then impinge on a set of deflection means 30. In the example shown, the laser beams previously travel through the beam shaping means 40. However, this order may be changed or the single elements of both sets may alternate, i.e. one element of the beam shaping means 40 may be arranged between two elements of the deflection means 30.

It is generally also possible that the beam delivery means 14 form part of the telescopic means 40 or part of the deflection means 30. In the latter case the beam delivery means 14 may constitute the first set of mapping mirrors. The number of required optical elements is then advantageously reduced.

In the depicted embodiment, the set of deflection means 30 comprises one deflection means 33a-33i per laser beam. These deflection means 33a-33i may also be referred to as a first set of mapping means 33. In general, the deflection means may be any means that change the propagation direction of a laser beam. In the shown example, the deflection means are mirrors. The mirrors of the set can be positioned independently from one another. Consequently, the arrangement of the laser beams impinging on the deflection means 30 can be altered by adjusting the position of the individual mirrors 33a-33i. The latter can thus be referred to as mapping mirrors 33a-33i.

The mapping mirrors 33a-33i are tiltable and displaceable, that is translationally movable. For tilting the mirrors, each mapping mirror 33a-33i is gimbal mounted. A control unit (not depicted) may be adapted to set a desired position of each mapping mirror 33a-33i via the gimbals.

After leaving the deflection means 30, the laser beams impinge on a number of common optical elements, i.e. optical elements onto which all laser beams impinge. These may comprise a telescopic device 45 for global adjustment of the focuses of the laser beams. In contrast to the set of telescopic means 40 described above, the telescopic device 45 affects all laser beams equally.

The optical elements in the beam path may further comprise means for altering or homogenizing the intensity profile of a light beam, means for changing a polarisation of the light beams, in particular for achieving a common polarisation over the whole cross section of a light beam, or for depolarising the light beams.

Finally, the laser beams are directed out of the apparatus 100 by a scanning mirror device 50. This device 50 may comprise two galvanometer scanners 50, each having a rotatable common mirror 50a onto which all laser beams impinge. With two galvanometer scanners 50, any direction of travel can be readily set for the laser beams.

Figure 2A:
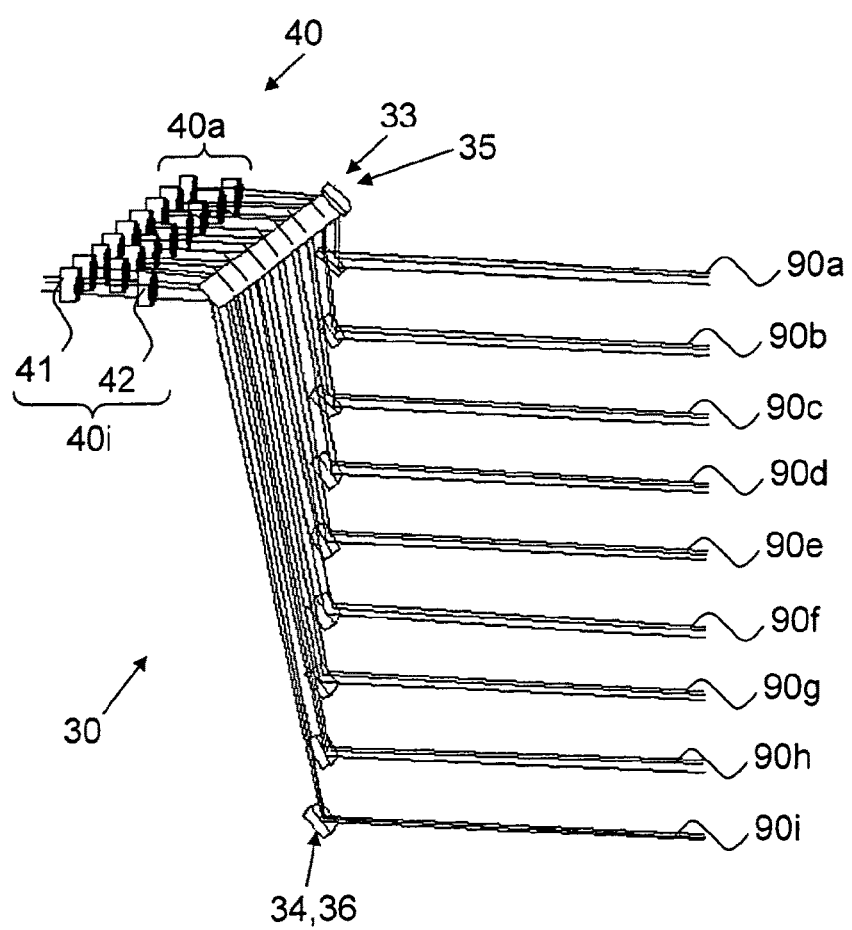
FIG. 2A to 2C show different views of a first configuration of a set of beam shaping means and a set of deflection means.
Figure 2B:
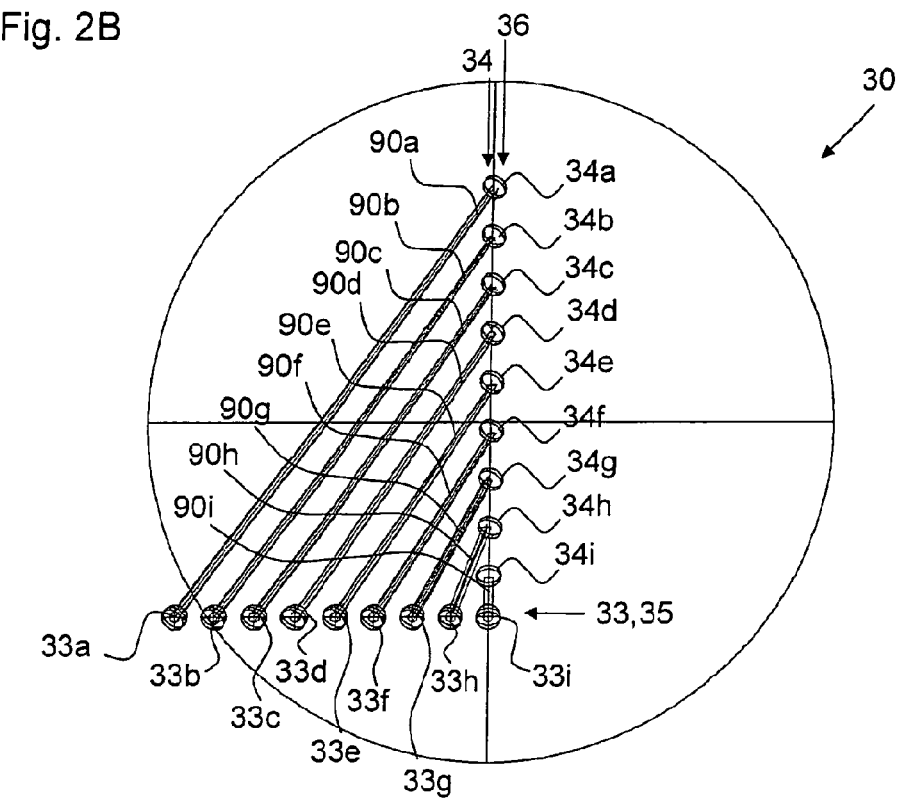
Figure 2C:
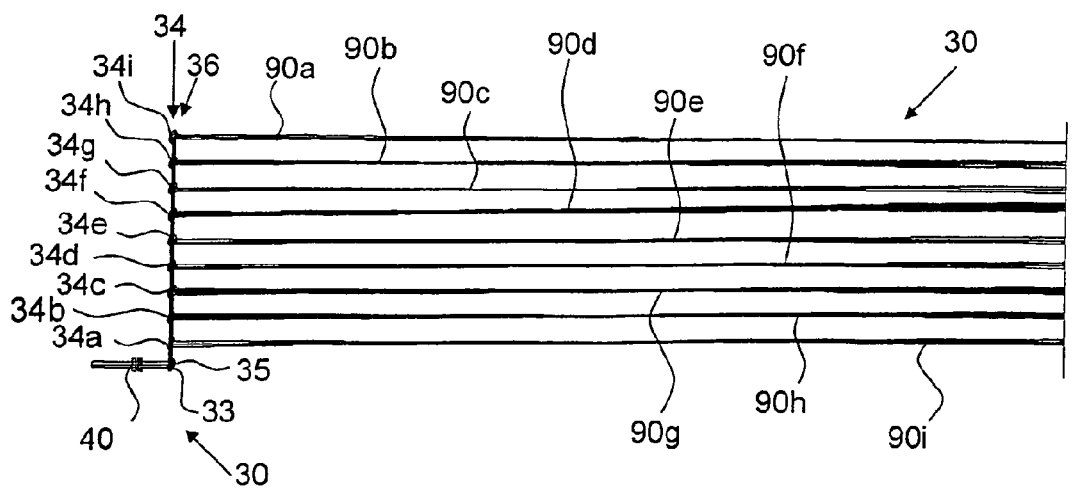

A first arrangement of the set of deflection means 30 and the set of beam shaping means 40 is shown in FIG. 2A to 2C from different perspectives.

For beam shaping and collimating the laser beams 90a-90i, the set of beam shaping means 40 comprises a plurality of beam shaping means 40a-40i, each having at least two lenses 41 and 42. For adjusting the focus of each laser beam 90a-90i and thus a spot size on an object to be marked, the lenses 41 and 42 can be offset in the propagating direction of the laser beams 90a-90i. The beam shaping means 40a-40i therefore constitute telescopic means 40a-40i. As there is one telescopic means 40a-40i for each laser beam 90a-90i, the beams can also be adjusted for path length differences.

After passing the telescopic means 40a-40i, the laser beams 90a-90i impinge on a set of deflection means 30 which comprises a first and a second set of mapping mirrors 33, 34. That is, each light beam 90a-90i is directed from a first mapping mirror 33a-33i to a second mapping mirror 34a-34i. The mapping mirrors of the first set 33 and those of the second set 34 are each arranged in a linear array 35, 36.

In the example shown, the laser beams 90a-90i are mapped with the set of deflection means 30 such that a linear arrangement of laser beams is rotated, e.g. by 90°. This configuration can thus also be referred to as a horizontal to vertical pixel mapper. The first and second set of mapping mirrors 33, 34 are arranged in one plane and perpendicular to one another.

With the gimbal mounts, the mapping mirrors 33, 34 can be adjusted such that the outgoing laser beams 90a-90i run in parallel in the desired direction.

A scanning motion of the laser beams 90a-90i for printing a sign on an object may be performed by the second set of mapping mirrors 34. Alternatively, the second set of mapping mirrors 34 may direct the laser beams 90a-90i to a scanning mirror device.

Figure 3A:
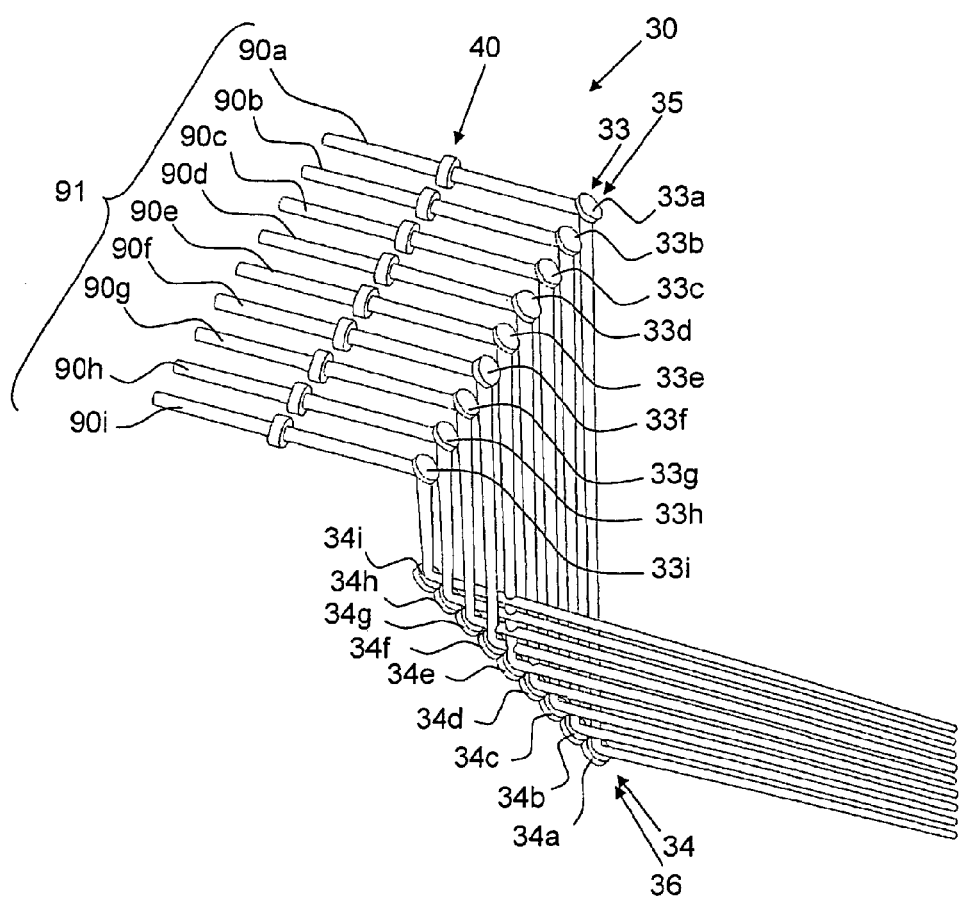
FIG. 3A to 3C show different views of a second configuration of a set of beam shaping means and a set of deflection means.
Figure 3B:
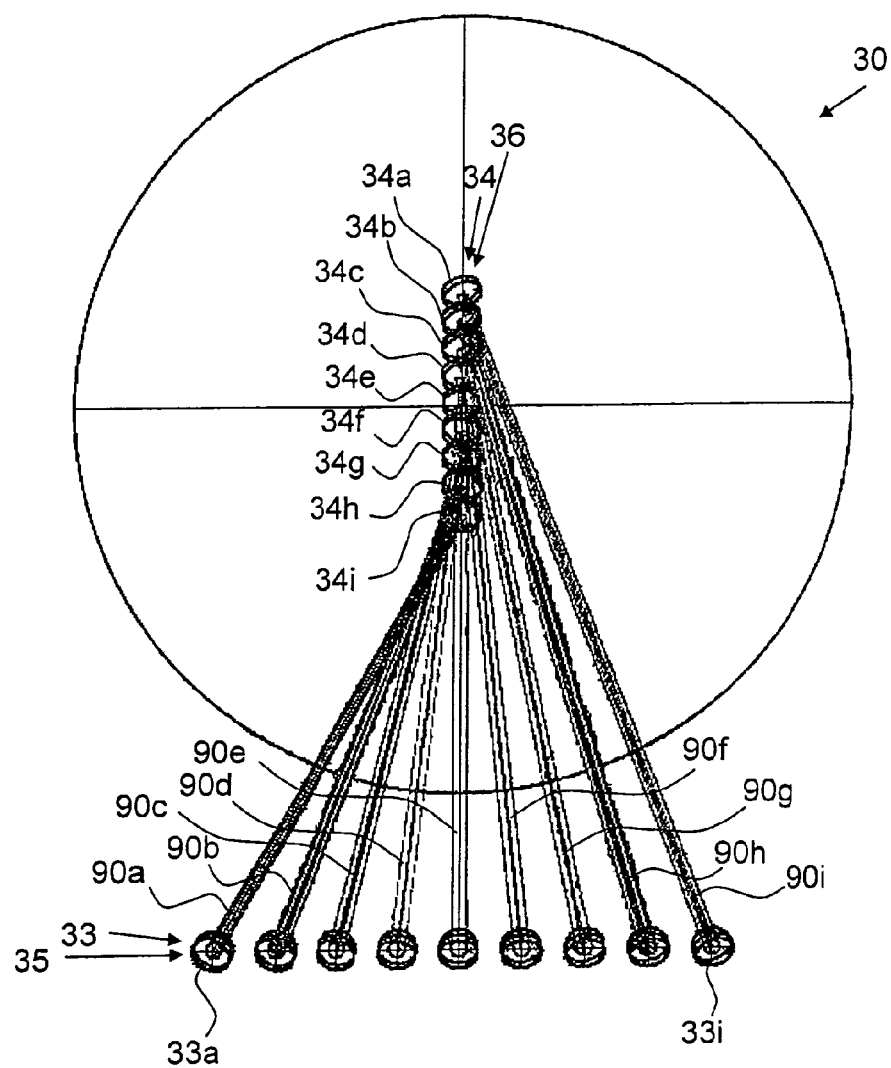
Figure 3C:
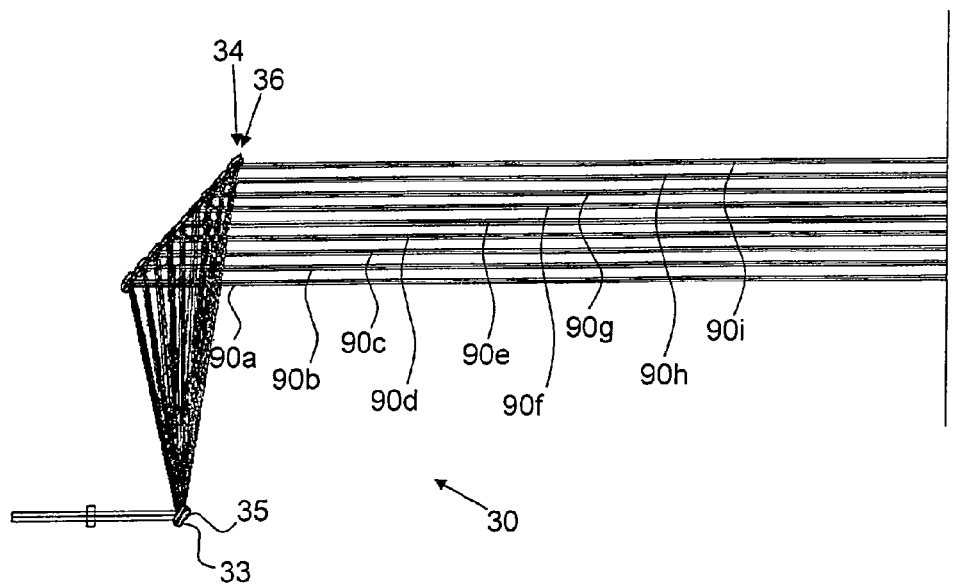

FIG. 3A to 3C show different schematic views of another configuration of the set of beam shaping means 40 and the set of deflection means 30.

This configuration differs from the previous one in the arrangement of the first and second set of mapping mirrors 33, 34. In the present case, the sets 33, 34 form linear arrays which—unlike the former configuration—are not in one plane. Rather, the two linear arrays are at an angle, in this case 45°, to reduce the space between the laser beams 90a-90i. At the same time, the linear arrangement of laser beams 90a-90i is rotated by 90°.

Figure 4A:
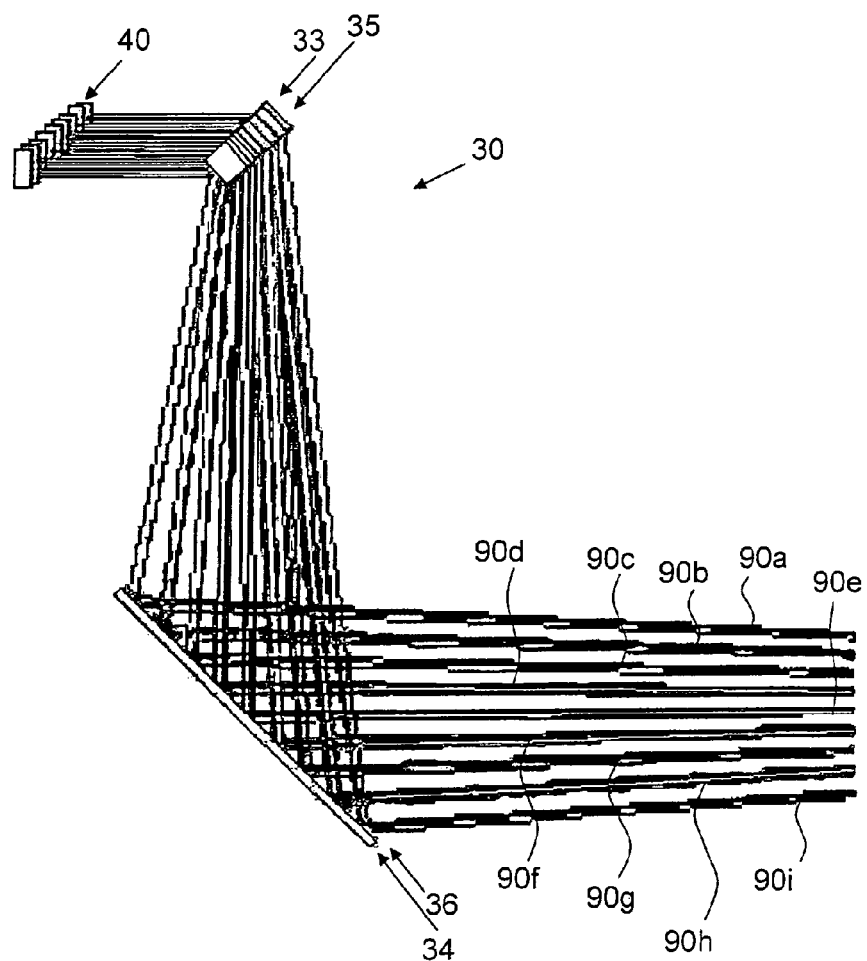
FIGS. 4A and 4B show different views of a third configuration of a set of beam shaping means and a set of deflection means.
Figure 4B:
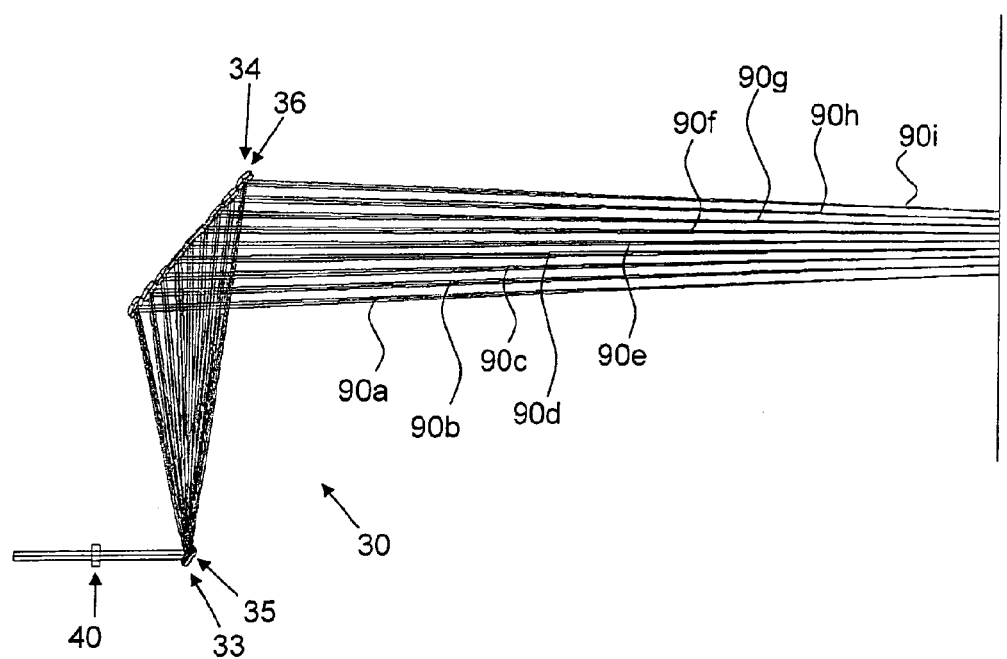

FIGS. 4A and 4B show still another configuration of the mapping mirrors 33, 34. As in the previous cases, the configuration depicted in FIGS. 4A and 4B exhibits mapping mirrors of a first and a second set 33, 34, each set being arranged in a linear array 35, 36. In the incident embodiment, however, the mapping mirrors of the second set 34 are tilted such that the reflected laser beams 90a-90i converge, that is the beam separation is further reduced depending on the desired separation at the desired distance from the apparatus for varying the resolution and dimensions of markings being produced.

The mapping mirrors of the second set 34 may be tiltable via gimbal mounts by the control unit. The mapping mirrors of the first set 33 may either be fixed such that a displacement of these mirrors is not possible during a printing operation, or the mirrors may be gimballed as well.

Preferably, the mapping mirrors of the second set 34 are tiltable via gimbal mounts by the control unit. The mapping mirrors of the first set 33 may either be fixed such that a displacement of these mirrors is not possible during a printing operation, or the mirrors may be gimballed as well.

In the embodiments shown in FIG. 2A to 4B, a scanning motion of the laser beams 90a-90i may be performed by tilting the mapping mirrors 34a-34i of the second set of mapping mirrors 34. Scanning devices such as galvanometer scanners with a common mirror for redirecting all laser beams 90a-90i are in this case not present. However, it may also be useful to provide such scanning devices.

For setting the deflection means to any of the configurations shown in the FIG. 2A to 2C, 3A to 3C, and 4A and 4B, a control unit may be provided.

Figure 5:
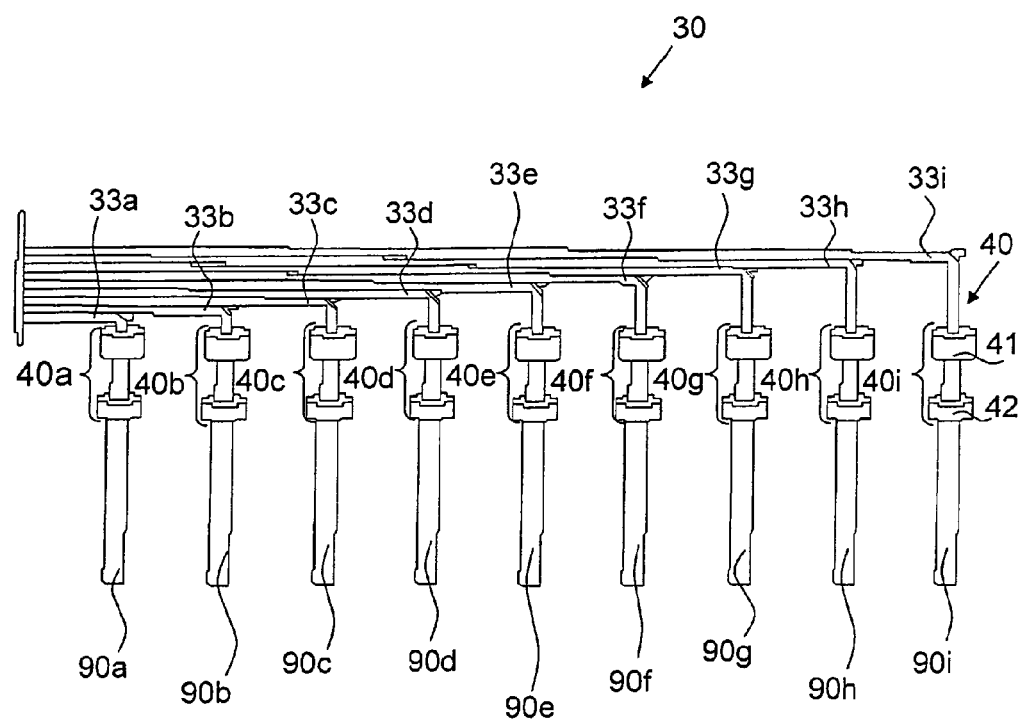
FIG. 5 shows still another configuration of a set of deflection means.

FIG. 5 shows schematically another arrangement of mapping mirrors 33a-33i. Here, the set of deflection means 30 consists of a single set of mapping mirrors 33. A linear array of laser beams 90a-90i passing through the telescopic means 40a-40i is reflected from the mapping mirrors 33a-33i such that the beam distance between the laser beams 90a-90i is reduced. The beam distance may be the same between any two neighbouring reflected laser beams 90a-90i. In the example shown, the line of laser beams 90a-90i is not rotated out of a plane formed by the mapping mirrors 33a-33i and the telescopic means 40a-40i. Tilting the mapping mirrors 33a-33i such that the reflected laser beams 90a-90i run out of said plane would result in a change of the beam distance or separation. Therefore, in this embodiment a scanning motion of the laser beams 90a-90i is not performed with the set of deflection means 30. Rather at least one scanning device as shown in FIG. 1 is provided.

Reducing the beam separation allows the design of the stack of gas lasers to be optimized for thermal cooling and RF excitation without penalizing the resolution or character size of the print, i.e., a larger separation of the gas lasers can be compensated.

Figure 6:
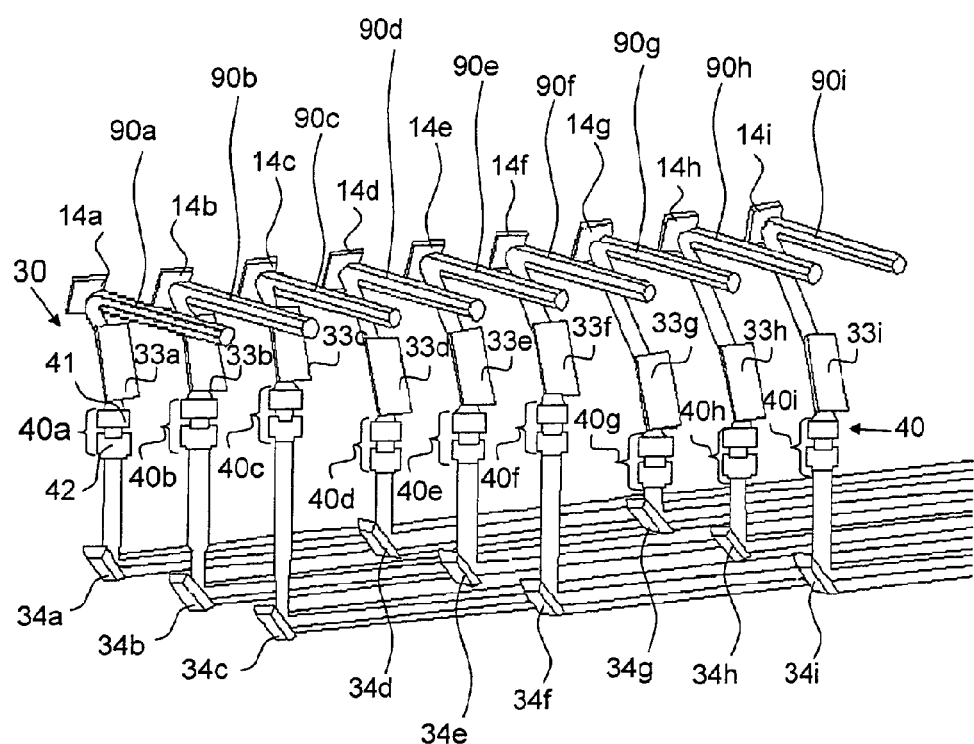
FIG. 6 shows a configuration of mapping mirrors of a set of deflection means for rearranging the laser beams into a two-dimensional array.

FIG. 6 depicts a configuration of the mapping mirrors for rearranging the laser beams 90a-90i into a two-dimensional array of laser beams, e.g. a three by three square. Once again, the set of deflection means 30 comprises a first and a second set of mapping mirrors 33, 34. In the example shown, the telescopic means 40a-40i are arranged between the first and the second set of mapping mirrors 33, 34. However, the telescopic means 40a-40i may instead be arranged prior to the first set 33 or after the second set 34 of mapping mirrors.

Also shown in FIG. 6 are the beam delivery means which redirect the light beams 90a-90i coming from the lasers to the first set of mapping mirrors 33. The beam delivery means are formed by a set of mirrors 14a-14i, i.e. one beam delivery means per laser beam. In other embodiments, this set may be substituted by one long mirror.

The mapping mirrors 34a-34i of the second set are arranged in a two-dimensional array such that the reflected laser beams 90a-90i are mapped in a two-dimensional array. The distance between the laser beams 90a, 90i being most distant to one another is greatly reduced, especially in comparison to any linear arrangement of the laser beams. The beams are more tightly packed and therefore go through the central portion of optical elements, such as focusing optics 45. As optical aberrations occur mainly in the outer regions of optical elements, the two dimensional arrangement has the benefit of improved focusing and beam quality of the laser beams. Especially the outer most laser beams suffer less distortion compared to a linear arrangement of the laser beams. Furthermore, the size of optical elements can be reduced, leading to lower overall costs.

Figure 7:
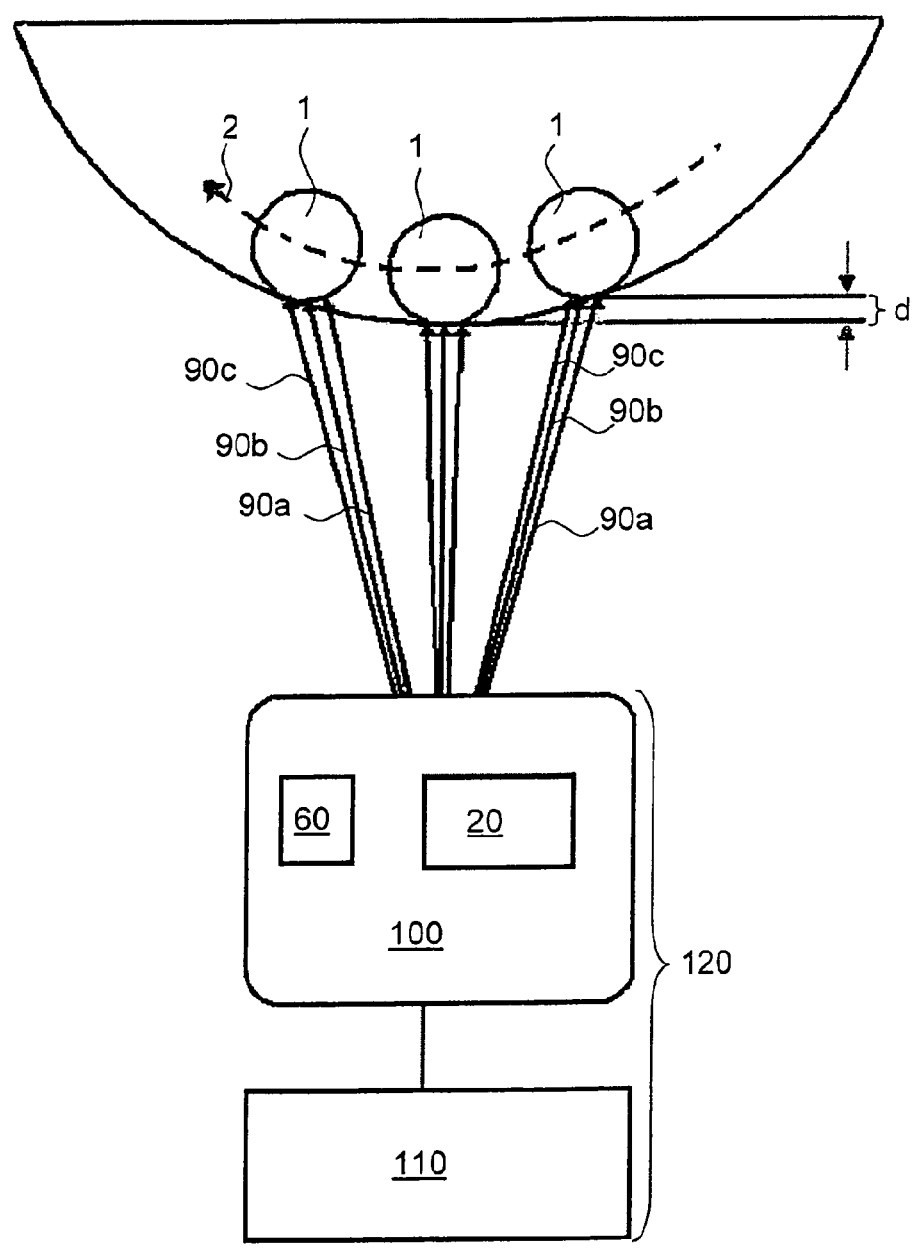
FIG. 7 shows a marking system according to the invention and an object to be marked moving relative to the marking system.

FIG. 7 shows schematically a marking system 120 and an object 1 to be marked.

The object 1 is moved in an object movement direction 2 and is depicted in three different positions, that is at three different points in time. The marking system 120 comprises a marking apparatus 100 and pivoting means 110 for tilting the marking apparatus 100.

The marking apparatus 100 may comprise any components as described above, e.g. deflection means constituted by two sets of mapping mirrors each arranged in a linear array. As shown in FIG. 7, a control unit 20 is also provided as well as positioning means 60. The latter serves for positioning the linear arrays of mapping mirrors. The individual mapping mirrors may be fixed within the respective array such that they cannot be displaced but tilted, e.g. with gimbal mounts.

The marking apparatus 100 emits a plurality of laser beams, three of which 90a, 90b, 90c are shown in FIG. 7. As the object 1 moves, the laser beams 90a, 90b, 90c are correspondingly redirected.

Depending on the shape and the position of the object 1, the distance between the apparatus 100 and the object 1 may change by as much as indicated with the reference sign d.

Furthermore, at one point in time, the distance may be different for each laser beam 90a, 90b, 90c. Still, the spot sizes of the laser beams 90a, 90b, 90c on the object 1 are to be equal. To this end, beam shaping means as described above are provided and adjusted by the control unit 20.

In the following, the function and benefit of the pivoting means 110 are explained with reference to FIG. 8A to 8D, each of which shows schematically the arrangement of laser beams 90a-90i emitted by the apparatus 100 relative to an object movement direction 2.

Figure 8D:
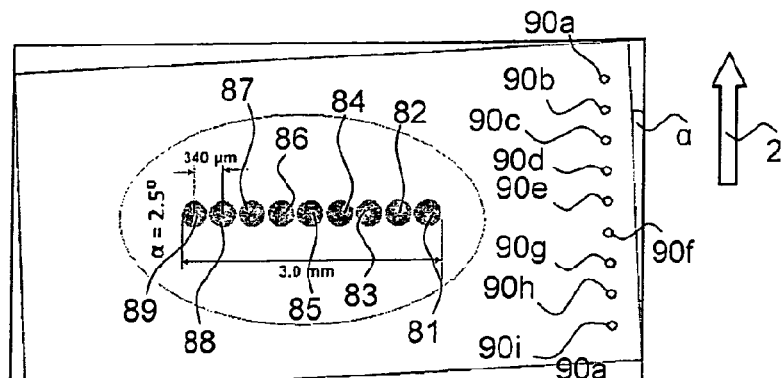
FIG. 8A to 8D schematically show an arrangement of laser beams exiting the inventive marking apparatus relative to an object movement direction, and markings produced by the laser beams.
Figure 8C:
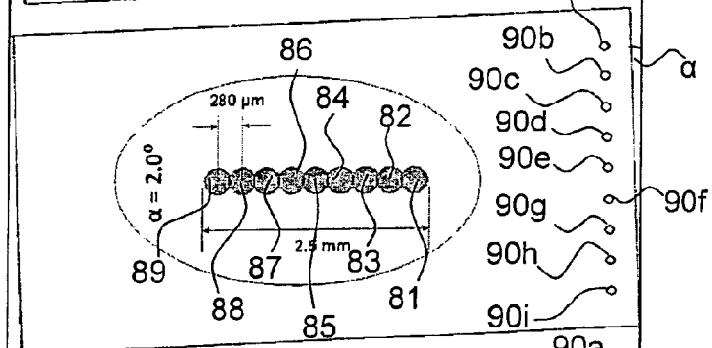
Figure 8B:
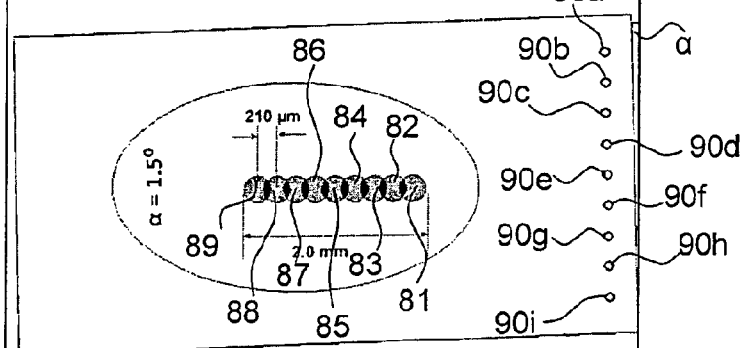
Figure 8A:
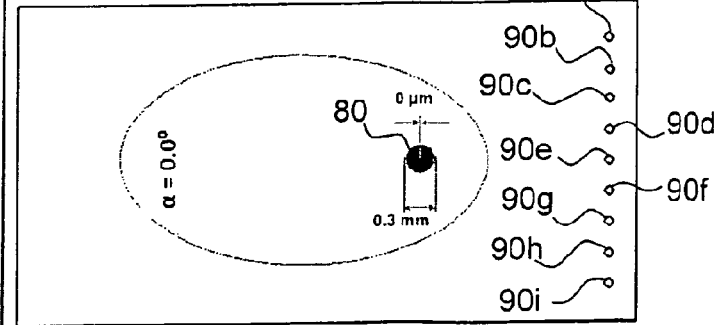

In FIG. 8A the linear arrangement of laser beams 90a-90i is parallel to the object movement direction. At least two of the laser beams 90a-90i impinge on the same spot 80 on the object 1 by individually delaying the firing of the gas lasers. The delay may be set to be equal to the separation between the laser beams 90a-90i divided by the speed of the object or the speed of the object in the direction of the linear arrangement of laser beams.

In the FIG. 8B to 8D the linear arrangement of laser beams 90a-90i is angularly tilted to the direction of travel 2 of the object by an angle α. This tilt angle α may be set with the pivoting means 110. Together with a delay of the firing, the tilting leads to the printing of a line formed by dots 81-89. The dots 81-89 may overlap, as in FIG. 8B, or may be separated as in FIGS. 8C and 8D. The length of the line thus produced is determined by the tilt angle α between the laser beams 90a-90i and the object movement direction 2. The size of each dot 81 to 89 and thus the width of the line can then be controlled with the beam shaping means.

The described marking apparatus may exhibit minimal space requirements as the laser volume of each laser at least partially surrounds a common inner area which is used for housing optical elements. Among these, a set of deflection means allows for changing the beam separation and re-arranging a plurality of laser beams produced by the gas lasers. Each laser beam can be individually adjusted by beam shaping means.

The invention claimed is:

1. A marking apparatus for marking an object with laser light, the marking apparatus comprising:
   a plurality of distinct gas lasers;
   a control unit configured to individually activate each of the distinct gas lasers in the plurality of distinct gas lasers to emit a laser beam according to a sign to be marked,
   wherein the distinct gas lasers are vertically stacked such that the laser beams emitted by the distinct gas lasers form an array of laser beams,
   wherein each distinct gas laser comprises resonator tubes arranged in the shape of a ring that at least partially surrounds an inner area;
   beam delivery means for directing the array of laser beams into the inner area; and
   a set of deflection means for rearranging the array of laser beams into a desired array of laser beams,
   the set of deflection means is arranged in the inner area and comprises at least one deflection means per laser beam,
   wherein each deflection means is at least one of: individually adjustable in its deflection direction or individually shiftable,
   wherein the control unit is further adapted to adjust the set of deflection means such that the laser beams of at least two gas lasers are directed onto a common spot; and a telescopic device with at least two lenses for global adjustment of the focal lengths of the laser beams, wherein the telescopic device is located within the inner area.

2. The marking apparatus according to claim 1, wherein the laser beams emitted by the distinct gas lasers form a linear array with parallel laser beams.

3. The marking apparatus according to claim 1, wherein the at least one deflection means per laser beam is at least one mapping mirror or one optical waveguide per laser beam, respectively.

4. The marking apparatus according to claim 1, wherein the deflection means are adjusted such that a beam separation between the laser beams is reduced.

5. The marking apparatus according to claim 1, wherein the set of deflection means comprises a first and a second set of mapping mirrors,
   each set of mapping mirrors comprises at least one mapping mirror per laser beam, and
   the first set of mapping mirrors directs the laser beams onto the second set of mapping mirrors.

6. The marking apparatus according to claim 1, wherein the control unit is adapted for at least one of: shifting the deflection means or adjusting the deflection directions of the deflection means.

7. The marking apparatus according to claim 1, wherein the control unit is adapted for controlling the deflection means to set a degree of convergence or divergence of the laser beams emanating from the deflection means.

8. The marking apparatus according to claim 1, wherein the control unit is adapted to delay the activation of each distinct gas laser individually such that, in the case of an object moving relative to the marking apparatus in an object movement direction, at least two laser beams impinge on the object at the same position in the object movement direction.

9. The marking apparatus according to claim 1, wherein each deflection means is an optical waveguide, and the optical waveguides have the same length.

10. The marking apparatus according to claim 1, wherein the ring is arranged in a triangular, rectangular, square or U-pattern.

11. The marking apparatus according to claim 1, wherein each distinct gas laser comprises a partially reflecting output coupler, and the partially reflecting output couplers are configured to emit laser beams travelling in parallel to each other.

12. The marking apparatus according to claim 1, wherein each distinct gas laser comprises connecting elements that connect adjacent laser tubes of the respective distinct gas laser to form a common tubular space.

13. The marking apparatus according to claim 12, wherein the connecting elements of the distinct gas lasers each comprise an inner cavity which is in fluidic communication with the at least two adjacent resonator tubes connected to the connecting element.

14. The marking apparatus according to claim 12, wherein a plurality of connecting elements of the distinct gas lasers are integrated into a common support structure formed in a corner area of the marking apparatus.

15. The marking apparatus according to claim 11, wherein each distinct gas laser includes an integrated output flange connected between two resonator tubes, the integrated output flange comprising the partially reflecting output coupler and a rear mirror of the respective distinct gas laser.

16. The marking apparatus according to claim 15, wherein the beam delivery means are arranged in each of the integrated output flanges to the laser beam of the respective gas laser into the inner area.

17. A marking system comprising:
   the marking apparatus according to claim 1,
   wherein the marking apparatus is pivotably supported to be tiltable relative to an object movement direction of the object to be marked.

18. The marking apparatus according to claim 1, wherein the resonator tubes include a plurality of resonator tubes for each of the distinct gas lasers.

19. The marking apparatus according to claim 1, wherein the plurality of distinct gas lasers includes at least two gas lasers stacked vertically on top of each other.

20. The marking apparatus according to claim 1, wherein the ring has a substantially rectangular shape.

21. The marking apparatus according to claim 1, wherein the telescopic device is surrounded by the ring of distinct gas lasers.

* * * * *